US012360472B2

(12) United States Patent
Yamada et al.

(10) Patent No.: US 12,360,472 B2
(45) Date of Patent: *Jul. 15, 2025

(54) IMAGE FORMING APPARATUS AND IMAGE FORMING METHOD

(71) Applicant: FUJIFILM Business Innovation Corp., Tokyo (JP)

(72) Inventors: Yoshiteru Yamada, Kanagawa (JP); Daisuke Tano, Kanagawa (JP); Kenta Shingu, Kanagawa (JP); Yuka Kawamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 18/439,220

(22) Filed: Feb. 12, 2024

(65) Prior Publication Data

US 2025/0053109 A1 Feb. 13, 2025

(30) Foreign Application Priority Data

Aug. 4, 2023 (JP) ................................ 2023-128182

(51) Int. Cl.

*G03G 15/02* (2006.01)
*G03G 15/01* (2006.01)
*G03G 21/00* (2006.01)

(52) U.S. Cl.

CPC ..... *G03G 15/0216* (2013.01); *G03G 15/0189* (2013.01); *G03G 21/0011* (2013.01); *G03G 2215/2093* (2013.01)

(58) Field of Classification Search

CPC ............. G03G 9/0819; G03G 21/0017; G03G 15/161

See application file for complete search history.

(56) References Cited

U.S. PATENT DOCUMENTS

| | | | | |
|---|---|---|---|---|
| 2009/0279930 A1* | 11/2009 | Kabata | ............... | G03G 21/0094 399/346 |
| 2012/0231379 A1* | 9/2012 | Nukada | .................. | G03G 21/18 430/134 |
| 2016/0320740 A1* | 11/2016 | Toyama | ............ | G03G 21/0017 |

FOREIGN PATENT DOCUMENTS

| | | |
|---|---|---|
| JP | 2005-345493 A | 12/2005 |
| JP | 2010-102327 A | 5/2010 |

* cited by examiner

*Primary Examiner* — Jessica L Eley
(74) *Attorney, Agent, or Firm* — Oliff PLC

(57) ABSTRACT

An image forming apparatus includes an image holder; a charging unit that charges a surface of the image holder; an electrostatic charge image forming unit that forms an electrostatic charge image on the charged surface of the image holder; a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower; a transfer unit that transfers the toner image formed on the surface of the image holder to a surface of a recording medium; and a cleaning device having a cleaning blade that is brought into contact with and cleans an outer peripheral surface of the image holder and that is constituted of a polyurethane resin, in which a total amount of F and Si present within 200 nm from a surface of the cleaning blade, which is brought into contact with the image holder accounts for 75% or more of a total amount of F and Si present within 5 μm from the surface.

14 Claims, 3 Drawing Sheets

IMAGE FORMING APPARATUS AND IMAGE FORMING METHOD

CROSS-REFERENCE TO RELATED APPLICATIONS

This application is based on and claims priority under 35 USC 119 from Japanese Patent Application No. 2023-128182 filed Aug. 4, 2023.

BACKGROUND

(i) Technical Field

The present disclosure relates to an image forming apparatus and an image forming method.

(ii) Related Art

In an image forming apparatus (such as a copy machine, a facsimile machine, or a printer) using an electrophotographic method, a toner image formed on the surface of an image holder such as a photoreceptor is transferred to the surface of a recording medium and fixed on the recording medium such that an image is formed. A cleaning blade is used to clean the outer peripheral surface of the image holder.

For example, in JP2005-345493A, "a cleaning blade for cleaning foreign matter such as residual powder, the cleaning blade including a blade main body in which an edge portion can be brought into pressurized contact with a surface on which the foreign matter remains, and a lubricant layer provided on a surface of the blade main body that faces at least a surface on which the foreign matter remains, in which the blade main body is set to be brought into a pressurized contact state, in which the edge portion and the lubricant layer are simultaneously brought into pressurized contact with the surface on which the foreign matter remains." is disclosed.

In JP2010-102327A, "a cleaning blade for removing residual toner on an image carrier or a transfer member, the cleaning blade including a contact portion at a tip of a base portion, in which a shore D hardness of the base portion is 50 or more and 80 or less, a dynamic friction coefficient of ASTM D1894 is 0.4 or less, a shore A hardness of the contact portion is 1 or more and 70 or less, and a Heidon type dynamic friction coefficient to polycarbonate at a friction speed of 2,000 mm/min is 1.2 or less." is disclosed.

SUMMARY

An object of the present disclosure is to provide an image forming apparatus and an image forming method, in which the occurrence of toner filming on the surface of the image holder is suppressed and wear in the cleaning blade is suppressed, compared to an image forming apparatus and an image forming method, in which a cleaning blade where the total amount of F and Si present within 200 nm from a surface which is brought into contact with the image holder is less than 75% with respect to the total amount of F and Si present within 5 μm from the surface is provided.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above object include the following aspect.

According to an aspect of the present disclosure, there is provided an image forming apparatus including, an image holder, a charging unit that charges a surface of the image holder, an electrostatic charge image forming unit that forms an electrostatic charge image on the charged surface of the image holder, a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower, a transfer unit that transfers the toner image formed on the surface of the image holder to a surface of a recording medium, and a cleaning device having a cleaning blade that is brought into contact with and cleans an outer peripheral surface of the image holder and that is constituted of a polyurethane resin, in which a total amount of F and Si present within 200 nm from a surface of the cleaning blade, which is brought into contact with the image holder, accounts for 75% or more of a total amount of F and Si present within 5 μm from the surface.

BRIEF DESCRIPTION OF THE DRAWINGS

Exemplary embodiment(s) of the present invention will be described in detail based on the following figures, wherein.

DETAILED DESCRIPTION

Figure 1:
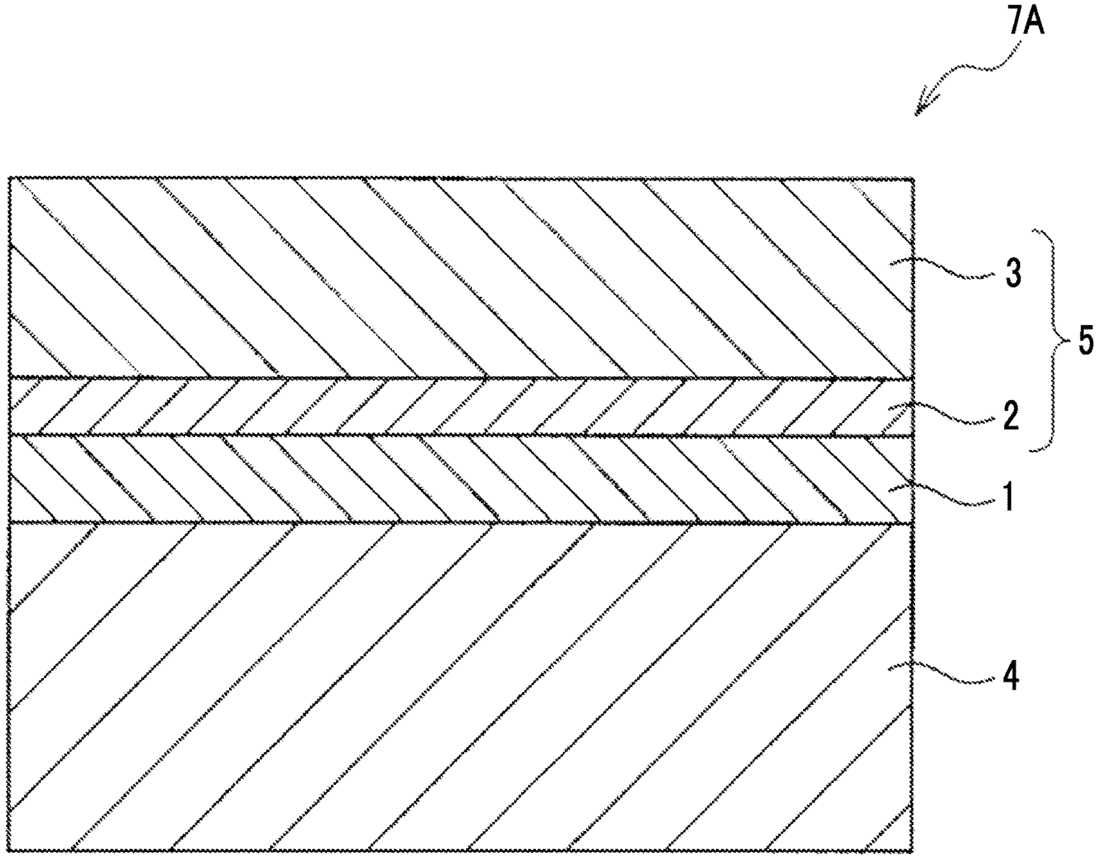
FIG. 1 is a schematic cross-sectional view showing an example of the layer configuration of the electrophotographic photoreceptor used in the present exemplary embodiment.

Hereinafter, the present exemplary embodiment as an example of the present disclosure will be described. The description and examples of these exemplary embodiments illustrate the exemplary embodiments and do not limit the scopes of the exemplary embodiments.

Regarding the ranges of numerical values described in stages in the present exemplary embodiment, the upper limit value or lower limit value of a range of numerical values may be replaced with the upper limit or lower limit of another range of numerical values described in stages. In addition, regarding the ranges of numerical values described in the present exemplary embodiment, the upper limit value or lower limit value of a range of numerical values may be replaced with values described in examples.

In the present exemplary embodiment, the term "step" includes not only an independent step but also a step that cannot be clearly distinguished from other steps but can achieve the expected object thereof.

In the present exemplary embodiment, in a case where an exemplary embodiment is described with reference to drawings, the configuration of the exemplary embodiment is not limited to the configuration shown in the drawings. In addition, the sizes of members in each drawing are conceptual, and a relative relationship between the sizes of the members is not limited thereto.

In the present exemplary embodiment, each component may include two or more kinds of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

Image Forming Apparatus

The image forming apparatus according to the present exemplary embodiment includes an image holder, a charging unit that charges the surface of the image holder, an electrostatic charge image forming unit that forms an electrostatic charge image on the charged surface of the image holder, a developing unit that accommodates an electrostatic charge image developer containing a toner having toner particles and develops the electrostatic charge image formed on the surface of the image holder as a toner image by using the electrostatic charge image developer, a transfer unit that transfers the toner image formed on the surface of the image holder to the surface of a recording medium, and a cleaning device having a cleaning blade that is brought into contact with and cleans an outer peripheral surface of the image holder.

In the toner particles, the release agent present in a region within 800 nm from a surface of the toner particles is 70% or more of the release agent in the entire toner particles and a melting temperature of the release agent is 65° C. or higher and 80° C. or lower. The cleaning blade is constituted of a polyurethane resin, in which the total amount of F and Si present within 200 nm from the surface which is brought into contact with the image holder accounts for 75% or more of a total amount of F and Si present within 5 μm from the surface.

With the above configuration, in the image forming apparatus according to the present exemplary embodiment, the occurrence of toner filming on the surface of the image holder is suppressed and wear in the cleaning blade is suppressed. The reason is presumed as follows.

From the viewpoint of improving the low-temperature fixability of an image, it has been studied to use a toner having toner particles in which wax having a low melting temperature is unevenly distributed on a surface layer, specifically, a toner in which a release agent present in a region within 800 nm from a surface of the toner particles is 70% or more of the release agent in the entire toner particles and a melting temperature of the release agent is 65° C. or higher and 80° C. or lower. However, in a case where toner particles in which wax having a low melting temperature is unevenly distributed on the surface layer are used, toner filming may easily occur on the surface of the image holder during repeatedly forming the image having a low image density in a high temperature and high humidity environment. This is considered to be because the toner particles in which the wax having a low melting temperature as described above has been unevenly distributed on the surface layer are soft in the high temperature and high humidity environment and are easily crushed. Furthermore, this is considered to be because the pressure applied from the cleaning blade to one toner particle is increased by reducing the number of toner particles present on the image holder by repeatedly forming an image having a low image density.

On the other hand, a method of suppressing the occurrence of toner filming by adjusting the cleaning blade pressed against the image holder can be considered. Examples thereof include a method of suppressing the toner filming by adjusting the pressing force NF (gf/mm) of the cleaning blade and the pressing angle WA (°) of the cleaning blade to improve the scraping property. However, in a case where the scraping property of the cleaning blade is improved, the cleaning blade is worn more severely and the life of the cleaning blade is shortened. Therefore, in addition to suppressing toner filming, suppression of the wear of the cleaning blade is also required.

On the other hand, in the image forming apparatus according to the present exemplary embodiment, the cleaning blade in which the total amount of F and Si present within 200 nm from the surface which is brought into contact with the image holder accounts for 75% or more of the total amount of F and Si present within 5 μm from the surface is used. That is, F and Si are unevenly distributed in the vicinity of the contact portion with the image holder in the cleaning blade. In a case where at least one of F or Si is present in the contact portion, the friction of the cleaning blade is reduced, and the behavior of the cleaning blade is stabilized at the tip of the contact portion. Accordingly, even in a case where toner particles in which wax having a low melting temperature is unevenly distributed on the surface layer as described above is used, the occurrence of toner filming on the surface of the image holder during repeatedly forming the image having a low image density in a high temperature and high humidity environment is suppressed.

In addition, in a case where at least one of F or Si is present in the contact portion, the friction of the cleaning blade is reduced, and the wear of the cleaning blade is also suppressed.

From the above, according to the image forming apparatus according to the present exemplary embodiment, it is presumed that the occurrence of toner filming on the surface of the image holder is suppressed and the wear in the cleaning blade is suppressed.

Toner

The toner contained in the electrostatic charge image developer used in the image forming apparatus according to the present exemplary embodiment will be described. The toner contains toner particles, and in the toner particles, the release agent present in a region within 800 nm from a surface of the toner particles is 70% or more of the release agent in the entire toner particles and a melting temperature of the release agent is 65° C. or higher and 80° C. or lower.

The toner particles contain a release agent and may further contain a binder resin. In addition, the toner particles may contain other internal additives such as a colorant.

Release Agent

The melting temperature of the release agent is 65° C. or higher and 80° C. or lower, for example, preferably 68° C. or higher and 77° C. or lower, more preferably 70° C. or higher and 75° C. or lower. In a case where the melting temperature of the release agent is 80° C. or lower, the low-temperature fixability of the image may be improved. On the other hand, in a case where the melting temperature of the release agent is 65° C. or higher, the occurrence of toner filming on the surface of the transfer belt is suppressed.

The melting temperature of the release agent is determined from a DSC curve obtained by differential scanning calorimetry (DSC) by "peak melting temperature" described in the method for determining the melting temperature in JIS K-7121-1987, "Testing methods for transition temperatures of plastics".

As for the release agent, 70% or more of the all release agents is present within 800 nm from the surface of the toner particles (hereinafter, the abundance ratio of the release agent present within 800 nm from the surface of the toner particles is referred to as "surface layer ratio of release agent").

The surface layer ratio of the release agent is 70% or more, for example, preferably 75% or more, and more preferably 80% or more. The upper limit value of the surface layer ratio of the release agent is, for example, preferably 100%. In a case where the surface layer ratio of the release agent is 70% or more, the low-temperature fixability of the image can be improved.

Here, a method of measuring the surface layer ratio of the release agent will be described.

Samples and images for measurement are prepared by the following methods.

The toner is mixed with and embedded in an epoxy resin, and the epoxy resin is solidified. The obtained solidified substance is cut with an ultramicrotome device (UltracutUCT manufactured by Leica Microsystems), thereby producing a thin sample having a thickness of 80 nm or more and 130 nm or less. By using an ultra-high resolution field emission scanning electron microscope (FE-SEM, S-4800 manufactured by Hitachi High-Tech Corporation), an SEM image of the thin sample is obtained. In the SEM image, a toner particle cross section in which the maximum length of 85% or more of the volume-average particle size of the toner particles is selected, the domain of the release agent is observed, the area of the release agent of the entire toner particles and the area of the release agent present in the region within 800 nm from the surface of the toner particles are determined, and the ratio of the two areas (the area of the release agent present in the region within 800 nm from the surface of the toner particles/the area of the release agent of the entire toner particles) is calculated. Then, this calculation is performed for 100 toner particles, and an average value thereof is defined as the surface layer ratio of the release agent.

The reason for selecting toner particle cross sections in which the maximum length is 85% or more of the volume-average particle size of the toner particles is that cross sections in which the maximum length is less than 85% of the volume-average particle size are expected to be cross sections of the end portions of the toner particles, and thus the state of the domain in the toner particles is not sufficiently reflected on the cross section of the end portions of the toner particles.

Examples of the control method for setting the surface layer ratio of the release agent to 70% or more include a method in which toner particles have a core/shell structure and a release agent is used when forming a shell.

Examples of the release agent include hydrocarbon-based wax such as paraffin wax; natural wax such as carnauba wax, rice wax, and candelilla wax; synthetic or mineral/petroleum-based wax such as montan wax; ester-based wax such as fatty acid esters and montanic acid esters; and the like. The release agent is not limited to the agents.

As the release agent, for example, a hydrocarbon-based wax is preferably used. The hydrocarbon-based wax is a wax having a hydrocarbon as a skeleton, and examples thereof include Fischer-Tropsch wax, a polyethylene-based wax (a wax having a polyethylene skeleton), a polypropylene-based wax (a wax having a polypropylene skeleton), a paraffin-based wax (a wax having a paraffin skeleton), a microcrystalline wax, and the like. Among these, from the viewpoint of fixability, for example, the hydrocarbon-based wax may be Fischer-Tropsch wax, a polyethylene wax, or polypropylene wax. In addition, from the viewpoint of fixability, for example, a plurality of types of hydrocarbon-based waxes are preferably contained in the toner particles.

The ratio of the hydrocarbon-based wax to the all release agents may be, for example, 85% by mass or more, and is preferably 95% by mass or more and more preferably 100% by mass.

The content of the release agent is, for example, preferably 1% by mass or more and 20% by mass or less, more preferably 3% by mass or more and 20% by mass or less, even more preferably 3% by mass or more and 15% by mass or less, and even still more preferably 5% by mass or more and 15% by mass or less with respect to the entire toner particles.

Binder Resin

As the binder resin, for example, a polyester resin is preferably used. The ratio of the polyester resin to the all binder resins may be, for example, 75% by mass or more, and is preferably 90% by mass or more and more preferably 100% by mass.

Examples of the polyester resin include known amorphous polyester resins. As the polyester resin, a crystalline polyester resin may be used in combination with an amorphous polyester resin. Provided that the content of the crystalline polyester resin may be, for example, in a range of 2% by mass or more and 40% by mass or less (for example, preferably 2% by mass or more and 20% by mass or less) with respect to the all binder resins.

The "crystallinity" of a resin indicates that a clear endothermic peak is present in differential scanning calorimetry (DSC) rather than a stepwise change in endothermic amount and specifically indicates that the half-width of the endothermic peak in a case of measurement at a temperature rising rate of 10 (C/min) is within 10° C.

On the other hand, the "amorphous" resin indicates that the half-width is more than 10° C., a stepwise change in endothermic amount is shown, or a clear endothermic peak is not recognized.

Amorphous Polyester Resin Examples of the amorphous polyester resin include a polycondensate of a polyvalent carboxylic acid and a polyhydric alcohol. As the amorphous polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters of these (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, an anhydride of these, a lower alkyl ester of these (for example, having 1 or more and 5 or less carbon atoms) thereof.

One kind of polyvalent carboxylic acid may be used alone, or two or more kinds of polyvalent carboxylic acids may be used in combination.

Examples of the polyhydric alcohol include an aliphatic diol (for example, ethylene glycol, diethylene glycol, triethylene glycol, propylene glycol, butanediol, hexanediol, or neopentyl glycol), an alicyclic diol (for example, cyclohexanediol, cyclohexanedimethanol, or hydrogenated bisphenol A), and an aromatic diol (for example, an ethylene oxide adduct of bisphenol A or a propylene oxide adduct of bisphenol A). Among these, as the polyhydric alcohol, for example, an aromatic diol or an alicyclic diol is preferable, and an aromatic diol is more preferable.

As the polyhydric alcohol, a polyhydric alcohol having a valency of 3 or more that has a crosslinked structure or a branched structure may be used in combination with a diol. Examples of the polyhydric alcohol having a valency of 3 or more include glycerin, trimethylolpropane, and pentaerythritol.

The polyhydric alcohol may be used alone or in combination of two or more kinds.

The glass transition temperature (Tg) of the amorphous polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the amorphous polyester resin is, for example, preferably 5,000 or more and 1,000,000 or less, and more preferably 7,000 or more and 500,000 or less.

The number-average molecular weight (Mn) of the amorphous polyester resin is, for example, preferably 2,000 or more and 100,000 or less.

The molecular weight distribution Mw/Mn of the amorphous polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC•HLC-8120GPC manufactured by Tosoh Corporation as a measurement device, TSKgel Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The amorphous polyester resin is obtained by a well-known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is distilled off. In a case where a monomer with poor compatibility takes part in the copolymerization reaction, for example, the monomer with poor compatibility may be condensed in advance with an acid or an alcohol that is to be polycondensed with the monomer, and then polycondensed with the major component.

Crystalline Polyester Resin

Examples of the crystalline polyester resin include a polycondensate of polyvalent carboxylic acid and polyhydric alcohol. As the crystalline polyester resin, a commercially available product or a synthetic resin may be used.

Here, since the crystalline polyester resin easily forms a crystal structure, the crystalline polyester resin is, for example, preferably a polycondensate that is not formed of an aromatic-containing polymerizable monomer but is formed of a linear aliphatic polymerizable monomer.

Examples of the polyvalent carboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), anhydrides of these dicarboxylic acids, and lower alkyl esters (for example, having 1 or more and 5 or less carbon atoms) of these dicarboxylic acids.

As the polyvalent carboxylic acid, a carboxylic acid having a valency of 3 or more that has a crosslinked structure or a branched structure may be used in combination with a dicarboxylic acid. Examples of the trivalent carboxylic acids include aromatic carboxylic acid (for example, 1,2,3-benzenetricarboxylic acid, 1,2,4-benzenetricarboxylic acid, 1,2,4-naphthalenetricarboxylic acid, and the like), anhydrides of these aromatic carboxylic acids, and lower alkyl esters (for example, having 1 or more and 5 or less carbon atoms) of these aromatic carboxylic acids.

As the polyvalent carboxylic acid, a dicarboxylic acid having a sulfonic acid group or a dicarboxylic acid having an ethylenically double bond may be used together with these dicarboxylic acids.

One kind of polyvalent carboxylic acid may be used alone, or two or more kinds of polyvalent carboxylic acids may be used in combination.

Examples of the polyhydric alcohol include an aliphatic diol (for example, a linear aliphatic diol having 7 or more and 20 or less carbon atoms in a main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the aliphatic diols, for example, 1,8-octanediol, 1,9-nonanediol, or 1,10-decanediol is preferable.

As the polyhydric alcohol, an alcohol having a valency of 3 or more that has a crosslinked structure or a branched structure, may be used in combination with the diol. Examples of the alcohol having a valency of 3 or more include glycerin, trimethylolethane, and trimethylolpropane, pentaerythritol.

The polyhydric alcohol may be used alone or in combination of two or more kinds.

Here, the content of the aliphatic diol in the polyhydric alcohol may be 80% by mole or more and, for example, preferably 90% by mole or more.

The melting temperature of the crystalline polyester resin is, for example, preferably 50° C. or higher and 100° C. or lower, more preferably 55° C. or higher and 90° C. or lower, and even more preferably 60° C. or higher and 85° C. or lower.

The melting temperature is determined from a DSC curve obtained by differential scanning calorimetry (DSC) by "peak melting temperature" described in the method for determining the melting temperature in JIS K7121-1987, "Testing methods for transition temperatures of plastics".

The weight-average molecular weight (Mw) of the crystalline polyester resin is, for example, preferably 6,000 or more and 35,000 or less.

The crystalline polyester resin can be obtained by a well-known manufacturing method, for example, same as the amorphous polyester resin.

Here, as the binder resin, other binder resins may be used in combination with the polyester resin. As the other binder resins, for example, a styrene (meth) acrylic resin is preferable.

Styrene (Meth)acrylic Resin

The styrene (meth)acrylic resin is a copolymer obtained by at least copolymerizing a monomer having a styrene skeleton and a monomer having a (meth)acryloyl group. Furthermore, "(meth)acrylic acid" is an expression including both of "acrylic acid" and "methacrylic acid". In addition, the "(meth)acryloyl group" is an expression including both the "acryloyl group" and the "methacryloyl group".

Examples of the monomer (hereinafter, referred to as "styrene-based monomer") having a styrene skeleton include styrene, alkyl-substituted styrene (such as α-methylstyrene, 2-methylstyrene, 3-methylstyrene, 4-methylstyrene, 2-ethylstyrene, 3-ethylstyrene, or 4-ethylstyrene), halogen-substituted styrene (such as 2-chlorostyrene, 3-chlorostyrene, or 4-chlorostyrene), and vinylnaphthalene. The styrene-based monomer may be used alone or in combination of two or more kinds thereof.

Among these, from the viewpoints of reaction, ease of control of reaction, and availability, as the styrene-based monomer, for example, styrene is preferable.

Examples of the monomer having a (meth)acryloyl group (hereinafter, referred to as "(meth)acrylic monomer") include (meth)acrylic acid and (meth)acrylic acid ester. Examples of the (meth)acrylic acid ester include (meth) acrylic acid alkyl ester (such as n-methyl (meth)acrylate, n-ethyl (meth)acrylate, n-propyl (meth)acrylate, n-butyl (meth)acrylate, n-pentyl (meth)acrylate, n-hexyl (meth) acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth) acrylate, isooctyl (meth)acrylate, 2-ethylhexyl (meth) acrylate, cyclohexyl (meth)acrylate, or t-butylcyclohexyl (meth)acrylate), (meth)acrylic acid aryl ester (such as phenyl (meth)acrylate, biphenyl (meth)acrylate, diphenylethyl (meth)acrylate, t-butylphenyl (meth)acrylate, or terphenyl (meth)acrylate), dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, and (meth)acrylamide. The (meth)acrylic acid-based monomer may be used alone or in combination of two or more kinds thereof.

The copolymerization ratio of the styrene-based monomer to the (meth)acrylic monomer (on a mass basis, styrene-based monomer/(meth)acrylic monomer) may be, for example, 85/15 to 70/30.

The styrene (meth)acrylic resin may have, for example, a crosslinked structure from the viewpoint of suppressing offset of an image. Examples of the styrene (meth)acrylic resin having a crosslinked structure include a crosslinked product crosslinked by at least copolymerizing a monomer having a styrene skeleton, a monomer having a (meth) acrylic acid skeleton, and a crosslinkable monomer.

Examples of the crosslinkable monomer include bifunctional or higher functional crosslinking agents.

Examples of the bifunctional crosslinking agent include divinylbenzene, divinylnaphthalene, a di(meth)acrylate compound (such as diethylene glycol di(meth)acrylate, methylenebis(meth)acrylamide, decanediol diacrylate, and glycidyl (meth)acrylate), polyester-type di(meth)acrylate, and 2-([1'-methylpropylideneamino]carboxyamino)ethyl methacrylate.

Examples of the polyfunctional crosslinking agent include a tri(meth)acrylate compound (such as pentaerythritol tri(meth)acrylate, trimethylolethane tri(meth)acrylate, or trimethylolpropane tri(meth)acrylate), tetra(meth)acrylate compound (such as tetramethylolmethane tetra(meth)acrylate or oligoester (meth)acrylate), 2,2-bis(4-methacryloxy polyethoxyphenyl) propane, diallyl phthalate, triallyl cyanurate, triallylisocyanurate, triallyl isocyanurate, triallyl trimellitate, and diallyl chlorendate.

The copolymerization ratio of the crosslinkable monomer to the total monomers (on a mass basis, crosslinkable monomer/total monomers) may be, for example, 2/1,000 to 30/1,000.

From the viewpoint of suppressing offset of an image, the weight-average molecular weight (Mw) of the styrene (meth)acrylic resin may be, for example, 30,000 or more and 200,000 or less, and is preferably 40,000 or more and 100,000 or less and more preferably 50,000 or more and 80,000 or less.

The weight-average molecular weight of the styrene (meth)acrylic resin is a value measured by the same method as the weight-average molecular weight of the polyester resin.

From the viewpoints of achieving both the fluidity and storage property of the toner and the suppression of offset of an image, the content of the styrene (meth)acrylic resin may be, for example, 10% by mass or more and 30% by mass or less, and is preferably 12% by mass or more and 28% by mass or less and more preferably 15% by mass or more and 25% by mass or less with respect to the toner particles.

Furthermore, other binder resins may be used in combination as the binder resin.

Examples of the other binder resins include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the other binder resins include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these other binder resins may be used alone, or two or more kinds of these binder resins may be used in combination.

The content of the binder resin is, for example, preferably 40% by mass or more and 95% by mass or less, more preferably 50% by mass or more and 90% by mass or less, and even more preferably 60% by mass or more and 85% by mass or less with respect to the entire toner particles.

Colorant

Examples of the colorant include various pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

One kind of colorant may be used alone, or two or more kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the entire toner particles is, for example, preferably 1% by mass or more and 30% by mass or less, and more preferably 3% by mass or more and 15% by mass or less.

Other Additives

Examples of the other additives in the toner include well-known additives such as a magnetic material, a charge control agent, and inorganic powder. The additives are incorporated into the toner particles as internal additives.

Characteristics of Toner Particles

The toner particles may be toner particles that have a single-layer structure or toner particles having a so-called core/shell structure that is configured with a core portion (core particle) and a coating layer (shell layer) covering the core portion, and for example, is preferably the core/shell structure. The toner particles having a core/shell structure are, for example, preferably configured with a core portion that is configured with a binder resin and a colorant, and a coating layer that is configured with a binder resin and a release agent.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The solution is added to 100 ml or more and 150 ml or less of the electrolytic solution.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are drawn from small-sized particles. The particle size at which the cumulative proportion of particles is 16% is defined as a volume-based particle size D16v and a number-based particle size D16p. The particle size at which the cumulative proportion of particles is 50% is defined as a volume-average particle size D50v and a number-average particle size D50p. The particle size at which the cumulative proportion of particles is 84% is defined as a volume-based particle size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

The shape factor SF1 of the toner particles is, for example, preferably 110 or more and 150 or less and more preferably 120 or more and 140 or less.

The shape factor SF1 is obtained by the following equation.

$$\text{Equation: } SF1 = (ML^2/A) \times (\pi/4) \times 100$$

In the above equation, ML represents the absolute maximum length of the toner, and A represents the projected area of the toner.

Specifically, the shape factor SF1 is quantified generally by analyzing a microscopic image or a scanning electron microscopic image using an image analyzer, and is calculated as follows. That is, the shape factor SF1 is obtained by capturing an optical microscopic image of particles scattered on the surface of the slide glass into a LUZEX image analyzer with a video camera, obtaining the maximum length and the projected area of 100 particles, and calculating with the above equation to obtain the average value thereof.

External Additive

The toner may further contain an external additive in addition to the toner particles.

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, NazO, $ZrO_2$, $CaO \cdot SiO_2 \cdot K_2O \cdot (TiO_2)_n$, $Al_2O_3 \cdot 2SiO_2$, $CaCO_3$, $MgCO_3$, $BaSO_4$, and $MgSO_4$.

The surface of the inorganic particles serving as the external additive may be subjected to, for example, a hydrophobic treatment. The hydrophobic treatment is performed, for example, by dipping the inorganic particles in a hydrophobic treatment agent. The hydrophobic treatment agent is not particularly limited, and examples thereof include a silane-based coupling agent, silicone oil, a titanate-based coupling agent, an aluminum-based coupling agent, and the like. Such hydrophobic treatment agent may be used alone or in combination of two or more kinds thereof.

The amount of the hydrophobic treatment agent is, for example, 1 part by mass or more and 10 parts by mass or less with respect to 100 parts by mass of the inorganic particles.

Examples of the external additive also include resin particles (resin particles of polystyrene, polymethylmethacrylate (PMMA), a melamine resin, or the like), a cleaning activator (for example, and a metal salt of a higher fatty acid represented by zinc stearate or fluorine-based polymer particles), and the like.

The amount of the external additive externally added is, for example, preferably 0.01% by mass or more and 5% by mass or less, and more preferably 0.01% by mass or more and 2.0% by mass or less with respect to the toner particles.

Manufacturing Method of Toner

The toner used in the image forming apparatus according to the present exemplary embodiment manufactures toner particles, and in a case where the toner particles further contain an external additive, the toner particles are manufactured by externally adding an external additive.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no particular restrictions on these manufacturing methods, and well-known manufacturing methods are adopted. Among the above methods, for example, the toner particles are preferably obtained by the aggregation and coalescence method.

Hereinafter, details of each step of the aggregation and coalescence method will be described. In the following section, a method for obtaining toner particles containing a colorant will be described. The colorant is used as necessary. Naturally, other additives different from the colorant may also be used.

Resin Particle Dispersion Preparing Step

First, a resin particle dispersion in which polyester resin particles to be a binder resin are dispersed, a colorant dispersion in which colorant particles are dispersed, and a release agent particle dispersion in which release agent particles are dispersed are prepared.

The polyester resin particle dispersion is prepared, for example, by dispersing the polyester resin particles in a dispersion medium by using a surfactant.

Examples of the dispersion medium used for the polyester resin particle dispersion include an aqueous medium.

Examples of the aqueous medium include distilled water, water such as deionized water, alcohols, and the like. Each of these media may be used alone, or two or more of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, an anionic surfactant and a cationic surfactant are particularly mentioned. The nonionic surfactant may be used in combination with an anionic surfactant or a cationic surfactant.

One surfactant may be used alone, or two or more surfactants may be used in combination.

Examples of the method for dispersing the polyester resin particles in the dispersion medium include general dispersion methods such as a rotary shearing homogenizer, a ball mill having media, a sand mill, and a dyno mill. Alternatively, the polyester resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (O phase) for causing neutralization, and then adding water (W phase), such that the resin undergoes phase transition from W/O to O/W and is dispersed in the aqueous medium in the form of particles.

The volume-average particle size of the polyester resin particles dispersed in the polyester resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the polyester resin particles, a particle size distribution is measured using a laser diffraction-type particle size distribution analyzer (for example, LA-700 manufactured by HORIBA, Ltd.), a cumulative volume distribution from small-sized particles is drawn for the particle size range (channel) divided using the obtained particle size distribution, and the particle size at which the cumulative proportion of particles is 50% of all particles is defined as a volume-average particle size D50v. For particles in other dispersions, the volume-average particle size is measured in the same manner.

The content of the polyester resin particles contained in the polyester resin particle dispersion is, for example, preferably 5% by mass or more and 50% by mass or less and more preferably 10% by mass or more and 40% by mass or less.

A colorant dispersion and a release agent particle dispersion are prepared in the same manner as in the polyester resin particle dispersion. That is, the dispersion medium, the dispersion method, the volume-average particle size of the particles, and the content of the particles in the polyester resin particle dispersion are the same for the colorant dispersion and the release agent particle dispersion.

First Aggregated Particle-Forming Step

Next, the polyester resin particle dispersion is mixed with the colorant dispersion.

Then, in the mixed dispersion, the polyester resin particles and the colorant particles are hetero-aggregated to form first aggregated particles which have a diameter close to the diameter of the target toner particles and include the polyester resin particles and the colorant particles.

A release agent particle dispersion may also be mixed as necessary, and the release agent particles may be contained in the first aggregated particles.

Specifically, for example, the first aggregated particles are formed by adding an aggregating agent to the mixed dispersion, adjusting the pH of the mixed dispersion to be acidic (for example, a pH of 2 or more and 5 or less), adding a dispersion stabilizer thereto as necessary, heating the mixture to a temperature close to the glass transition temperature of the polyester resin (specifically, for example, a temperature higher than or equal to the glass transition temperature of the polyester resin—30° C. and lower than or equal to the glass transition temperature thereof—10° C.), and allowing the particles to be dispersed in the mixed dispersion to be aggregated.

In the first aggregated particle-forming step, for example, the heating may be performed after the mixed dispersion is stirred with a rotary shearing homogenizer, the aggregating agent is added thereto at room temperature (for example, 25° C.), the pH of the mixed dispersion is adjusted to be acidic (for example, a pH of 2 or more and 5 or less), and the dispersion stabilizer is added thereto as necessary.

Examples of the aggregating agent include a surfactant having polarity opposite to the polarity of the surfactant contained in the mixed dispersion, an inorganic metal salt, and a metal complex having a valency of 2 or higher. In a case where a metal complex is used as the aggregating agent, the amount of the aggregating agent used is reduced, and the charging characteristics are improved.

In addition to the aggregating agent, an additive that forms a complex or a bond similar to the complex with a metal ion of the aggregating agent may be used. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Second Aggregated Particle-Forming Step

The first aggregated particle dispersion in which the first aggregated particles are dispersed is obtained, and the first aggregated particle dispersion are then mixed with the polyester resin particle dispersion and the release agent particle dispersion. The polyester resin particle dispersion may be mixed with the release agent particle dispersion in advance, and this mixed liquid may be mixed with the first aggregated particle dispersion.

Then, in the mixed dispersion in which the first aggregated particles, the polyester resin particles, and the release agent particles are dispersed, the polyester resin particles and the release agent particles are aggregated to be adhered to the surface of the first aggregated particles, thereby forming second aggregated particles.

Specifically, for example, in the first aggregated particle-forming step, in a case where the first aggregated particles reach a target particle size, a dispersion in which the polyester resin particles and the release agent particles are dispersed is mixed with the first aggregated particle dispersion. Next, the mixed dispersion is heated at a temperature equal to or lower than the glass transition temperature of the polyester resin, the pH of the mixed dispersion is adjusted to, for example, a range of about 6.5 or more and 8.5 or less, and the progress of aggregation is stopped.

Accordingly, the second aggregated particles aggregated such that the polyester resin particles and the release agent particles adhere to the surface of the first aggregated particles are obtained.

Coalescence Step

The second aggregated particle dispersion in which the second aggregated particles are dispersed is then heated to, for example, a temperature equal to or higher than the glass transition temperature of the polyester resin (for example, a temperature equal to or higher than the glass transition temperature of the polyester resin by 10° C. to 50° C.) to coalesce the second aggregated particles, thereby forming toner particles.

Toner Particles are Obtained Through the Above Steps.

The toner particles may be manufactured, after obtaining a second aggregated particle dispersion in which the second aggregated particles are dispersed, through a step of mixing the second aggregated particle dispersion with a polyester resin particle dispersion in which polyester resin particles are dispersed to cause the polyester resin particles to be aggregated and adhered to the surface of the second aggregated particles and to form third aggregated particles, and a step of heating the third aggregated particle dispersion in which the third aggregated particles are dispersed to cause the third aggregated particles to coalesce and to form toner particles.

After the coalescence step ends, the toner particles formed in a solution are subjected to a known washing step, a solid-liquid separation step, and a drying step, thereby obtaining dry toner particles.

The washing step is not particularly limited. However, from the viewpoint of charging properties, displacement washing may be thoroughly performed using deionized water. The solid-liquid separation step is not particularly limited. However, in view of productivity, suction filtration, pressure filtration, or the like may be performed. Furthermore, the method of the drying step is not particularly limited. However, in view of productivity, freeze drying, flush drying, fluidized drying, vibratory fluidized drying, or the like may be performed.

For example, by adding an external additive to the dry toner particles and mixing the external additive and the toner particles together, the toner according to the present exemplary embodiment is manufactured. The mixing may be performed, for example, using a V blender, a Henschel mixer, a Lodige mixer, or the like. Furthermore, coarse particles of the toner may be removed as necessary by using a vibratory sieving machine, a pneumatic sieving machine, or the like.

Electrostatic Charge Image Developer

In the present exemplary embodiment, the electrostatic charge image developer accommodated in the developing unit contains at least the above-mentioned toner. The electrostatic charge image developer may be a one-component developer which contains only the toner or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing and mixing magnetic powder in a matrix resin; and a resin impregnation-type carrier obtained by impregnating porous magnetic powder with a resin; and the like. Each of the magnetic powder dispersion-type carrier and the resin impregnation-type carrier may be a carrier obtained by coating the surface of a core material, which is particles constituting the carrier, with a resin.

Examples of the magnetic powder include magnetic metals such as iron, nickel, and cobalt; magnetic oxides such as ferrite and magnetite; and the like.

Examples of the conductive particles include metals such as gold, silver, and copper, and particles such as carbon black, titanium oxide, zinc oxide, tin oxide, barium sulfate, aluminum borate, potassium titanate, and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond or a product obtained by modifying the straight silicone resin, a fluororesin, polyester, polycarbonate, a phenol resin, an epoxy resin, and the like. The coating resin and the matrix resin may contain additives such as conductive material.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like. Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the toner and the carrier, represented by toner:carrier, in the two-component developer is, for example, preferably 1:100 to 30:100 and more preferably 3:100 to 20:100.

Cleaning Blade

A cleaning blade used in the image forming apparatus according to the present exemplary embodiment will be described. The cleaning blade is constituted of a polyurethane resin. In the cleaning blade, the total amount of F and Si present within 200 nm from the surface (contact portion) which is brought into contact with the image holder accounts for 75% or more of a total amount of F and Si present within 5 μm from the surface.

The cleaning blade may be a blade of single-layered constitution consisting of one layer, may be a blade of two-layered constitution consisting of an edge layer (a layer which is brought into contact with the image holder) and a back surface layer, or may be a constitution in which three or more layers are laminated.

Surface Layer Ratio of F and Si

In the cleaning blade, a ratio (surface layer ratio of F and Si) of the total amount of F and Si present within 200 nm from the surface (contact portion) which is brought into contact with the image holder to the total amount of F and Si present within 5 μm from the surface is 75% or more. In a case where the surface layer ratio of F and Si in the contact portion of the cleaning blade is 75% or more, the friction of the contact portion of the cleaning blade is reduced, and the occurrence of toner filming on the surface of the image holder is suppressed and the occurrence of the wear in the cleaning blade is suppressed. The surface layer ratio of F and Si in the contact portion of the cleaning blade is, for example, preferably 85% or more and more preferably 90% or more.

On the other hand, the upper limit value of the surface layer ratio of F and Si in the contact portion of the cleaning blade is not particularly limited, but is preferably 95% or less and more preferably 93% or less. In a case where the surface layer ratio of F and Si in the contact portion of the cleaning blade is 95% or less, the occurrence of belly contact (decrease in surface pressure) due to insufficient tuck formation in the contact portion of the cleaning blade is suppressed.

Amount of surface F and Si

The total amount of F and Si (the amount of surface F and Si) present on the surface (contact portion) of the cleaning blade which is brought in contact with the image holder is, for example, preferably 15 atm % or more, more preferably 18 atm % or more, and even more preferably 20 atm % or more. In a case where the amount of surface F and Si in the contact portion of the cleaning blade is 15 atm % or more, the friction of the contact portion of the cleaning blade is reduced, and the occurrence of toner filming on the surface of the image holder is suppressed and the occurrence of the wear in the cleaning blade is suppressed.

The upper limit value of the amount of the surface F and Si in the contact portion of the cleaning blade is not particularly limited, but is, from the viewpoint of suppressing the occurrence of chipping in the contact portion of the cleaning blade, preferably 25 atm % or less and more preferably 22 atm % or less.

Amount of 50 nm position F and Si The total amount of F and Si (the amount of 50 nm position F and Si) present at a position of 50 nm from the surface (contact portion) of the cleaning blade which is brought in contact with the image holder is, for example, preferably 0.3 atm % or more, more preferably 1.0 atm % or more, and even more preferably 1.5 atm % or more. In a case where the amount of 50 nm position F and Si of the cleaning blade are 0.3 atm % or more, low friction at the contact portion of the cleaning blade is maintained, and the occurrence of the toner filming on the surface of the image holder and the occurrence of the wear of the cleaning blade is suppressed even at a lapse of time.

The upper limit value of the amount of the 50 nm position F and Si of the cleaning blade is not particularly limited, but is, from the viewpoint of suppressing the occurrence of chipping in the contact portion of the cleaning blade even at a lapse of time, preferably 2.0 atm % or less and more preferably 1.8 atm % or less.

A method of measuring a ratio (surface layer ratio of F and Si) of the total amount of F and Si present within 200 nm from the surface (contact portion) which is brought into contact with the image holder to the total amount of F and Si present within 5 μm from the surface in the cleaning blade will be described. That is, a method of analyzing the amount of F element and the amount of Si element in the depth direction from the contact portion of the cleaning blade will be described.

A region including a surface (contact portion) of the cleaning blade which is brought into contact with the image holder is cut out, and an amount (atm %) of each of N, C, O, F, and Si elements is measured with XPS (Versa Probe II, manufactured by Ulvac-PHI, Inc.) in the depth direction from the contact portion.

In addition, the total amount of F and Si present on the surface (contact portion) of the cleaning blade which is brought into contact with the image holder is obtained by calculating the ratio from the equation of SB/SA×100 in a case where the area up to a depth of 5 μm is defined as SA and the area up to a depth of 200 nm is defined as SB in the plot of the depth from the contact portion and the element ratio of the cleaning blade, which are obtained by the above-mentioned analysis in the depth direction. The total amount of F and Si present at a position of 50 nm from the surface (contact portion) of the cleaning blade which is brought into contact with the image holder is also obtained in the same manner.

100% Modulus (M100)

The 100% modulus of the cleaning blade in the surface (contact portion) that is brought into contact with the image holder at 23° C. is, for example, preferably 11 MPa or more and 22 MPa or less. Hereinafter, the 100% modulus in the contact portion of the cleaning blade at 23° C. is also referred to as "M100".

In a case where the M100 is 11 MPa or more, streak-like image defects caused by local turn-up of the blade are suppressed. From the viewpoint of suppressing streak-like image defects caused by local turn-up of the blade, the M100 is, for example, more preferably 13 MPa or more and still more preferably 15 MPa or more.

In addition, in a case where the M100 is 22 MPa or less, toner filming in the image holder is suppressed. From the viewpoint of suppressing toner filming, the M100 is, for example, more preferably 20 MPa or less and still more preferably 18 MPa or less.

The M100 is a value acquired from a stress in a case of 100% strain by performing measurement at a tensile speed of 500 mm/min and 23° C. using a dumbbell-shaped No. 3 test piece in conformity with JIS K 6251 (2010). For example, Strograph AE Elastomer (manufactured by Toyo Seiki Co., Ltd.) is used as a measuring device.

Examples of a method of setting the M100 to be in the above-described ranges include a method of adjusting the composition in the base material of the cleaning blade. Specific examples thereof include a method of adjusting the content of a polyisocyanate component in a case where the base material contains polyurethane rubber, a method of selecting at least one of the kind or the addition amount of a crosslinking agent in a case where a crosslinking agent is used for producing the base material, and a method of combining these methods. The M100 increases as the content of the polyisocyanate component increases.

Constitution

The cleaning blade is constituted of a polyurethane resin.

Polyurethane Resin

The polyurethane resin is a polyurethane resin obtained by polymerizing at least a polyol component and a polyisocyanate component. The polyurethane resin may be, as necessary, polyurethane resin obtained by polymerizing a resin containing a functional group capable of reacting with an isocyanate group of a polyisocyanate in addition to the polyol component.

The polyurethane resin preferably includes, for example, a hard segment and a soft segment. The term "hard segment" denotes, among polyurethane resin materials, a segment in which the material constituting the hard segment is relatively harder than the material constituting the soft segment, and the term "soft segment" denotes a segment in which the material constituting the soft segment is relatively softer than the material constituting the hard segment.

Examples of the material constituting the hard segment (hard segment material) include low-molecular-weight polyol components among polyol components and resins containing a functional group capable of reacting with an isocyanate group of a polyisocyanate. On the other hand, examples of the material constituting the soft segment (soft segment material) include high-molecular-weight polyol components among polyol components.

The average particle size of aggregates of the hard segment is, for example, preferably 1 μm or more and 10 μm or less, and more preferably 1 μm or more and 5 μm or less.

In a case where the average particle size of the aggregates of the hard segment is 1 μm or more, the frictional resistance of the surface of the contact member is likely to be reduced. Therefore, the behavior of the blade is stabilized, and local wear is likely to be suppressed.

On the other hand, in a case where the average particle size of the aggregates of the hard segment is 10 μm or less, the occurrence of chipping is likely to be suppressed.

The average particle size of the aggregates of the hard segment is measured as follows. By using a polarizing microscope (BX51-P manufactured by Olympus Corporation), an image is captured at 20× magnification, and image processing is performed to convert the image into a binary image. For each of 20 cleaning blades, particle sizes (equivalent circle diameters) of aggregates are measured at 5 spots (at each spot, particle sizes of 5 aggregates are measured), and the average particle size of the 500 aggregates is calculated.

Further, the binarization of the image is carried out by adjusting the thresholds of the hue, the chroma, and the brightness using image processing software OLYMPUS Stream essentials (manufactured by Olympus Corporation) such that the color of the aggregates of the crystal part and the hard segment is black and the color of the amorphous part (corresponding to the soft segment) is white.

Polyol Component

The polyol component contains a high-molecular-weight polyol and a low-molecular-weight polyol.

The high-molecular-weight polyol component is a polyol having a number-average molecular weight of 500 or more (for example, preferably 500 or more and 5,000 or less). Examples of the high-molecular-weight polyol component include known polyols such as a polyester polyol obtained by dehydration condensation of a low-molecular-weight polyol and a dibasic acid, a polycarbonate polyol obtained by a reaction between a low-molecular-weight polyol and an alkyl carbonate, a polycaprolactone polyol, and a polyether polyol. Examples of commercially available products of high-molecular-weight polyols include PLACCEL 205 and PLACCEL 240 manufactured by Daicel Corporation.

Here, the number-average molecular weight is a value measured by a gel permeation chromatography (GPC) method. The same applies hereinafter.

These high-molecular-weight polyols may be used alone or in combination of two or more kinds thereof.

The polymerization ratio of the high-molecular-weight polyol component is, for example, preferably 30% by mole or more and 50% by mole or less and is preferably 40% by mole or more and 50% by mole or less with respect to the total polymerization component of the polyurethane resin.

The low-molecular-weight polyol component is a polyol having a molecular weight (number-average molecular weight) of less than 500. The low-molecular-weight polyol is a material that functions as a chain extender and a crosslinking agent.

Examples of the low-molecular-weight polyol component include 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these, for example, 1,4-butanediol is preferably employed as the low-molecular-weight polyol component.

Examples of the low-molecular-weight polyol component include a diol (bifunctional), a triol (trifunctional), and a tetraol (tetrafunctional), which are known as chain extenders and crosslinking agents.

These polyols may be used alone or in combination of two or more kinds thereof.

The polymerization ratio of the low-molecular-weight polyol components to the total polymerization components of the polyurethane resin may be, for example, more than 50% by mole and 75% by mole or less, preferably 52% by mole or more and 75% by mole or less, more preferably 55% by mole or more and 75% by mole or less, and even more preferably 55% by mole or more and 60% by mole or less.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3'-dimethylbiphenyl-4,4'-diisocyanate (TODI).

As the polyisocyanate component, for example, 4,4'-diphenylmethane diisocyanate (MDI), 1,5-naphthalene diisocyanate (NDI), or hexamethylene diisocyanate (HDI) is more desirable.

These polyisocyanate components may be used alone or in combination of two or more kinds thereof.

The polymerization ratio of the polyisocyanate component to the total polymerization components of the polyurethane resin may be, for example, 5% by mole or more and 25% by mole or less, and preferably 10% by mole or more and 20% by mole or less.

Resin Containing Functional Group Capable of Reacting with Isocyanate Group

As the resin containing a functional group capable of reacting with an isocyanate group (hereinafter, referred to as "functional group-containing resin"), for example, a resin having flexibility is desirable, and an aliphatic resin having a linear structure is more desirable from the viewpoint of flexibility. Specific examples of the functional group-containing resin include an acrylic resin containing two or more hydroxyl groups, a polybutadiene resin containing two or more hydroxyl groups, and an epoxy resin containing two or more epoxy groups.

Examples of commercially available products of the acrylic resin containing two or more hydroxyl groups include ACTFLOW (grades: UMB-2005B, UMB-2005P, UMB-2005, UME-2005, and the like, manufactured by Soken Chemical & Engineering Co., Ltd.).

Examples of commercially available products of the polybutadiene resin containing two or more hydroxyl groups include R-45HT manufactured by Idemitsu Kosan Co., Ltd.

As the epoxy resin having two or more epoxy groups, for example, an epoxy resin is desirable which is not hard and brittle just as the general epoxy resins of the related art and is more flexible and tougher than the epoxy resin of the related art. As such an epoxy resin, for example, in view of molecular structure, an epoxy resin is preferable which has a structure (flexible skeleton) capable of improving mobility of the main chain in the main chain structure of the epoxy resin. Examples of the flexible skeleton include an alkylene skeleton, a cycloalkane skeleton, and a polyoxyalkylene skeleton. Among these, for example, a polyoxyalkylene skeleton is particularly preferable.

In addition, in terms of the physical properties, compared to the epoxy resin of the related art, for example, an epoxy resin having a low viscosity relative to the molecular weight is preferable. Specifically, for example, the weight-average molecular weight is in a range of 900±100 and the viscosity at 25° C. is desirably in a range of 15,000±5,000 mPa's and more desirably in a range of 15,000±3,000 mPa·s. Examples of commercially available products of the epoxy resin having the above-described characteristics include EPICLON EXA-4850-150 (manufactured by DIC Corporation).

The polymerization ratio of the functional group-containing resin may be, for example, within a range not impairing the characteristics of the cleaning blade.

Manufacturing Method of Polyurethane Resin

In the manufacturing method of polyurethane resin, a general manufacturing method of polyurethane such as a prepolymer method or a one-shot method. From the viewpoint of obtaining polyurethane having excellent abrasion resistance and excellent chipping resistance, the prepolymer method is preferable for the present exemplary embodiment, but the manufacturing method is not limited thereto.

The cleaning blade is produced by molding a composition for forming a cleaning blade prepared by the above method into a sheet by using, for example, centrifugal molding, extrusion molding, or the like and processing the sheet by cutting or the like.

Examples of the catalyst used for producing the polyurethane resin include an amine-based compound such as a tertiary amine, a quaternary ammonium salt, and an organometallic compound such as an organic tin compound.

Examples of the tertiary amine include trialkylamine such as triethylamine, tetraalkyl diamine such as N,N,N',N'-tetramethyl-1,3-butanediamine, aminoalcohol such as dimethylethanolamine, esteramine such as ethoxylated amine, ethoxylated diamine, or bis(diethylethanolamine) adipate, a cyclohexylamine derivative such as triethylenediamine (TEDA) or N,N-dimethylcyclohexylamine, a morpholine derivative such as N-methylmorpholine or N-(2-hydroxypropyl)-dimethylmorpholine, and a piperazine derivative such as N,N'-diethyl-2-methylpiperazine or N,N'-bis-(2-hydroxypropyl)-2-methylpiperazine.

Examples of the quaternary ammonium salt include 2-hydroxypropyltrimethylammonium octylate, 1,5-diazabicyclo [4.3.0]nonen-5 (DBN) octylate, 1,8-diazabicyclo [5.4.0]undec-7 (DBU)-octylate, DBU-oleate, DBU-p-toluenesulfonate, DBU-formate, and 2-hydroxypropyltrimethylammonium formate.

Examples of the organic tin compound include a dialkyltin compound such as dibutyltin dilaurate or dibutyltin di(2-ethylhexoate), stannous 2-ethylcaproate, and stannous oleate.

Among these catalysts, in view of hydrolysis resistance, triethylenediamine (TEDA), which is a tertiary ammonium salt, is used. Furthermore, in view of processability, a quaternary ammonium salt is used. Among the quaternary ammonium salts, 1,5-diazabicyclo [4.3.0]nonen-5 (DBN) octylate, 1,8-diazabicyclo [5.4.0]undec-7 (DBU)-octylate, or DBU-formate with high reaction activity is used.

The content of the catalyst is, for example, preferably in a range of 0.0005% by mass or more and 0.03% by mass or less and particularly preferably 0.001% by mass or more and 0.01% by mass or less of the entire polyurethane resin constituting the contact member.

These may be used alone or in combination of two or more kinds thereof.

Production of Cleaning Blade with Two-Layered Structure

For example, in a case where the cleaning blade has a two-layered constitution of an edge layer and a back surface layer, the cleaning blade is produced by manufacturing an edge layer and a back surface layer by the manufacturing method of a polyurethane resin, and bonding the obtained edge layer and back surface layer to each other.

Examples of the method in a case where the hardness of the edge layer and the hardness of the back surface layer are set to be different include a method of changing the material of the polyurethane resin, and include, for example, a method of changing the ratio of the hard segment and the soft segment.

Modification Treatment of Contact Portion

In the present exemplary embodiment, since the ratio (surface layer ratio of F and Si) of the total amount of F and Si present within 200 nm from the surface (contact portion) of the cleaning blade which is brought in contact with the image holder to the total amount of F and Si present within 5 μm from the surface is set to the above-mentioned range, for example, a modified layer obtained by impregnating the contact portion of the obtained cleaning blade with at least one of a F element or a Si element and performing surface modification treatment is preferably provided.

The modified layer is a layer obtained by impregnating the contact portion of the cleaning blade with a surface treatment liquid containing an isocyanate compound, an organic solvent, and a specific polymer having at least one of a F element or a Si element, and curing the surface treatment liquid (that is, the isocyanate compound and the specific polymer).

The modified layer is formed as a layer integrated with the surface layer of the contact portion such that the density of the layer gradually decreases toward the inside from the surface.

Examples of the isocyanate compound include 2,6-tolylene diisocyanate (TDI), 4,4'-diphenylmethane diisocyanate (MDI), paraphenylenediisocyanate (PPDI), 1,5-naphthalene diisocyanate (NDI), 3,3'-dimethyldiphenyl-4,4'-diisocyanate (TODI), and multimers and modified products of these. Examples of the modified product of the isocyanate compound include a urethane prepolymer in which an isocyanate compound is prepolymerized together with a polyol.

The specific polymer is, for example, preferably a compound that reacts with an isocyanate compound and chemically bonds thereto. Examples of the acrylic polymer having a siloxane bond include a block copolymer of (meth)acrylic acid ester and (meth)acrylic acid siloxane ester and a derivative thereof. "(Meth)acryl" denotes any one or both of acryl and methacryl.

Examples of the acrylic polymer having a fluorine atom include a block copolymer of (meth)acrylic acid ester and fluorinated alkyl (meth)acrylate and a derivative thereof.

The cleaning blade preferably contains, for example, a polymer (silicone-based polymer) having a siloxane bond at a contact portion with the image holder.

In addition, from the viewpoint of the solubility in an organic solvent, the specific polymer is, for example, preferably a compound containing a hydroxyl group, an alkyl group, or a carboxyl group.

Examples of a method of confirming that the specific polymer is contained in the surface layer of the contact portion of the cleaning blade and a method of confirming that the specific polymer which is an acrylic polymer is contained in the surface layer include the following methods. Specifically, the confirmation is made by estimating the structure and analyzing the composition of the surface layer material of the contact portion of the cleaning blade by an analysis method such as a Fourier transform infrared spectrophotometer (FTIR) or X-ray photoelectron spectroscopy (XPS).

The content of the specific polymer in the surface treatment liquid is, for example, 8 parts by mass or more and 13 parts by mass or less, and is preferably 9 parts by mass or more and 13 parts by mass or less and more preferably 10 parts by mass or more and 13 parts by mass or less with respect to 100 parts by mass of the isocyanate compound.

As the organic solvent, for example, an organic solvent that dissolves a specific polymer and is compatible with an isocyanate compound is preferable, and specific examples thereof include ethyl acetate, methyl ethyl ketone (MEK), toluene, acetone, and cyclohexanone. In addition, as the organic solvent, a reactive diluent such as 2-hydroxyethyl acrylate, tetrahydrofurfuryl acrylate, 2-hydroxyethyl methacrylate, hydroxypropyl methacrylate, glycidyl methacrylate, neopentyl glycol diacrylate, hexanediol diacrylate, or trimethylolpropane triacrylate may be used.

The modified layer is formed, for example, by impregnating and coating at least the contact portion of the cleaning blade with the surface treatment liquid described above, removing the organic solvent by drying, and forming the cured layer by heat treatment.

An impregnating and coating method is not particularly limited, and examples thereof include typical methods such as a blade coating method, a wire bar coating method, a spray coating method, a dip coating method, a bead coating method, an air knife coating method, and a curtain coating method. In a case where the impregnating and coating method is a dip coating method, the dipping time may be, for example, in a range of 10 seconds or longer and 60 seconds or shorter.

After the impregnation and coating, the surface treatment liquid may be dried, for example, under conditions of a temperature of 20° C. or higher and 30° C. or lower for 1 minute or longer and 10 minutes or shorter. The heat treatment may be performed, for example, under conditions of a temperature of 50° C. or higher and 80° C. or lower for 60 minutes or longer and 90 minutes or shorter.

Pressing Force NF and Pressing Angle WA

The product (NF×WA) of the static pressing force NF and the pressing angle WA between the cleaning blade and the image holder is, for example, preferably 40 or more and 60 or less. In a case where NF×WA is 40 or more, the occurrence of slip-through of the toner at a contact part of the image holder with the cleaning blade is suppressed. On the other hand, in a case where NF×WA is 60 or less, the occurrence of toner filming on the surface of the image holder is further suppressed. The NF×WA is, for example, more preferably 45 or more and 58 or less and even more preferably 50 or more and 56 or less.

The pressing force NF of the cleaning blade is calculated by the following formula.

$$\text{Formula: Pressing force } NF = k \times d$$

Figure 4:
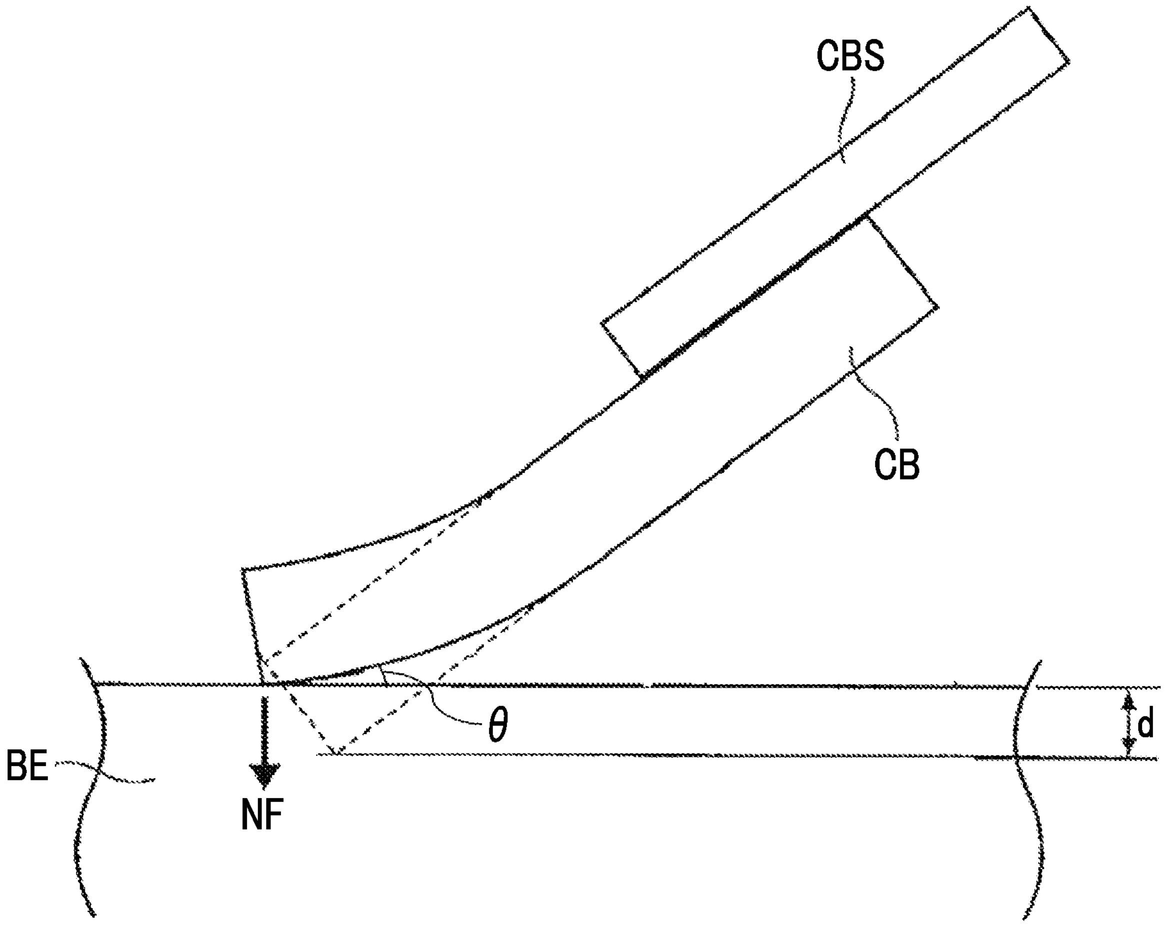
FIG. 4 is a schematic view for illustrating a pressing force to the image holder of the cleaning blade.

In the formula, k represents a spring constant unique to the cleaning blade, and d represents an intrusion of the cleaning blade into the image holder (see FIG. 4).

The spring constant k unique to the cleaning blade is obtained by causing displacement of a cleaning blade 12 and measuring the load with a load cell.

The intrusion d of the cleaning blade into the image holder is determined by fixing the cleaning blade 12 to a support member and calculating the amount of displacement of the cleaning blade caused in a case where the cleaning blade is brought into contact with the image holder.

In addition, as the pressing angle WA against the image holder of the cleaning blade, using the free length L (the length of a portion not fixed by the support member CBC) of the cleaning blade CB and the set angle θ (that is, an angle at the contact site formed between a linear portion of the cleaning blade CB (a portion not distorted by being pressed against the image holder BE) and the image holder BE) of the cleaning blade CB, the pressing angle WA is calculated from the following equation.

$$\text{Equation: pressing angle } WA = \theta - \tan^{-1}(3d/2L)$$

In FIG. 4, BE represents the image holder, CB represents the cleaning blade, and CBS represents the support member that supports the cleaning blade.

The static pressing force NF (normal force) of the cleaning blade on the image holder is, for example, preferably 1.5 gf/mm or more and 3.5 gf/mm or less and more preferably 2.3 gf/mm or more and 3.2 gf/mm or less.

The intrusion d of the cleaning blade into the image holder is, for example, preferably 0 mm or more and 10 mm or less, and more preferably 0.01 mm or more and 5 mm or less.

Image Holder

An image holder used in the image forming apparatus according to the present exemplary embodiment will be described. In the present exemplary embodiment, an electrophotographic photoreceptor (hereinafter, also referred to as a "photoreceptor") is used as an image holder on which a toner image is formed on the surface.

Examples of the photoreceptor include a photoreceptor configured to have a conductive substrate and a photosensitive layer provided on the conductive substrate.

Hereinafter, the electrophotographic photoreceptor will be described with reference to the accompanying drawings.

Examples of the electrophotographic photoreceptor 7 shown in FIG. 1 include a photoreceptor 7 having a structure in which an undercoat layer 1, a charge generation layer 2, and a charge transport layer 3 are laminated in this order on a conductive support 4. The charge generation layer 2 and the charge transport layer 3 constitute a photosensitive layer 5.

The electrophotographic photoreceptor 7 may have a layer configuration in which the undercoat layer 1 is not provided.

In addition, the electrophotographic photoreceptor 7 may be a photoreceptor having a single layer type photosensitive layer in which the functions of the charge generation layer 2 and the charge transport layer 3 are integrated. In the case of a photoreceptor having a single layer type photosensitive layer, the single layer type photosensitive layer constitutes the outermost surface layer.

In addition, the electrophotographic photoreceptor 7 may be a photoreceptor having a surface protective layer on the charge transport layer 3 or the single layer type photosensitive layer. In the case of a photoreceptor having a surface protective layer, the surface protective layer constitutes the outermost surface layer.

Hereinafter, each layer of the electrophotographic photoreceptor will be described in detail. The reference numerals will not be provided.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. In addition, examples of the conductive substrate also include paper, a resin film, a belt, and the like that are coated with a conductive compound (such as a conductive polymer or indium oxide), a metal (such as aluminum, palladium, or gold), or an alloy, or have undergone vapor deposition or lamination of these materials. Here, the term "conductive" denotes that the volume resistivity is less than $10^{13}$ Ω·cm.

In a case where the electrophotographic photoreceptor is used in a laser printer, for example, it is preferable that the surface of the conductive substrate is roughened such that a centerline average roughness Ra thereof is 0.04 μm or more and 0.5 μm or less for the purpose of suppressing interference fringes from occurring in a case of irradiation with laser beams. In a case where incoherent light is used as a light source, roughening of the surface to prevent interference fringes is not particularly necessary, and roughening of the surface to prevent interference fringes is appropriate for longer life because occurrence of defects due to the roughness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the fine pores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or more and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or more and 11% by mass or less, the concentration of the chromic acid is 3% by mass or more and 5% by mass or less, and the concentration of the hydrofluoric acid is 0.5% by mass or more and 2% by mass or less, and the concentration of all these acids may be 13.5% by mass or more and 18% by mass or less. The treatment temperature is, for example, preferably 42° C. or higher and 48° C. or lower. The film thickness of the coating film is, for example, preferably 0.3 μm or more and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or more and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $10^2$ Ω·cm or more and $10^{11}$ Ω·cm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2$/g or more.

The volume-average particle size of the inorganic particles may be, for example, 50 nm or more and 2,000 nm or less (for example, preferably 60 nm or more and 1,000 nm or less).

The content of the inorganic particles is, for example, preferably 10% by mass or more and 80% by mass or less and more preferably 40% by mass or more and 80% by mass or less with respect to the amount of the binder resin.

The inorganic particles may be subjected to a surface treatment. As the inorganic particles, inorganic particles subjected to different surface treatments or inorganic particles having different particle sizes may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy) silane, 2-(3,4-epoxycyclohexyl)ethyltrimethoxysilane, 3-glycidoxypropyltrimethoxysilane, 3-aminopropyltriethoxysilane, vinyltriacetoxysilane, 3-mercaptopropyltrimethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or more and 10% by mass or less with respect to the amount of the inorganic particles.

Here, the undercoat layer may contain an electron-accepting compound (acceptor compound) together with the inorganic particles, for example, from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophene compound; and a diphenoquinone compound such as 3,3',5,5'-tetra-t-butyldiphenoquinone.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particles include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, an ultrasonic disperser, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

The electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or more and 20% by mass or less and preferably 0.01% by mass or more and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials such as an electron transporting pigment including a polycyclic condensed electron transporting pigment or an azo-based electron transporting pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy) silane, 2-(3,4-epoxycyclohexyl) ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or more.

The surface roughness (ten-point average roughness) of the undercoat layer may be adjusted, for example, to 1/2 from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. In addition, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The film thickness of the undercoat layer is set to, for example, preferably 15 μm or more and more preferably 20 μm or more and 50 μm or less.

Interlayer

Although not shown in the figures, an interlayer may be further provided between the undercoat layer and the photosensitive layer.

The interlayer is, for example, a layer containing a resin. Examples of the resin used for the interlayer include polymer compounds such as an acetal resin (for example, polyvinyl butyral or the like), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, and a melamine resin.

The interlayer may be a layer containing an organometallic compound. Examples of the organometallic compound used for the interlayer include organometallic compounds containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, an air knife coating method, and a curtain coating method.

The film thickness of the interlayer is set to be, for example, preferably in a range of 0.1 μm or more and 3 μm or less. The interlayer may be used as the undercoat layer.

Charge Generation Layer

The charge generation layer is, for example, a layer containing a charge generation material and a binder resin. In addition, the charge generation layer may be a deposition layer of the charge generation material. The deposition layer of the charge generation material is, for example, preferable in a case where an incoherent light source such as a light emitting diode (LED) or an organic electroluminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or more and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

The n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $10^{13}$ Ω·cm or more.

These binder resins may be used alone or in the form of a mixture of two or more kinds thereof.

The blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. The charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a fine flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The film thickness of the charge generation layer is set to be, for example, in a range of preferably 0.1 μm or more and 5.0 μm or less and more preferably in a range of 0.2 μm or more and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material also include hole transporting compounds such as a triarylamine-based compound, a benzidine-based compound, an arylalkane-based compound, an aryl-substituted ethylene-based compound, a stilbene-based compound, an anthracene-based compound, and a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

(a-1)

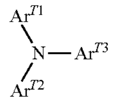

In Structural Formula (a-1), $Ar^{T1}$, $Ar^{T2}$, and $Ar^{T3}$ each independently represent a substituted or unsubstituted aryl group, $—C_6H_4—C(R^{T4})=C(R^{T5})(R^{T6})$, or $—C_6H_4—CH=CH—CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. In addition, examples of the substituent of each group described above include a substituted amino group substituted with an alkyl group having 1 or more and 3 or less carbon atoms.

(a-2)

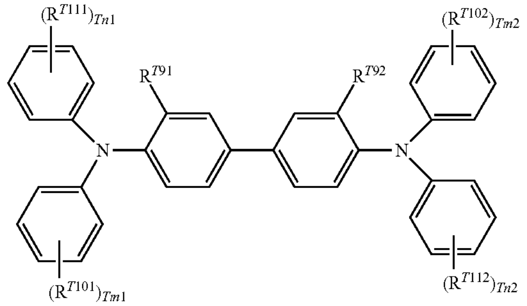

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, a substituted amino group substituted with an alkyl group having 1 or more and 2 or less carbon atoms, a substituted or unsubstituted aryl group, $—C(R^{T12})=C(R^{T13})(R^{T14})$, or $—CH=CH—CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of the substituent of each group described above include a halogen atom, an alkyl group having 1 or more and 5 or less carbon atoms, and an alkoxy group having 1 or more and 5 or less carbon atoms. In addition, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "—$C_6H_4$—CH═CH—CH—C($R^{T7}$)($R^{T8}$)" and a benzidine derivative having "—CH—CH—CH═C($R^{T15}$)($R^{T16}$)" are particularly preferable from the viewpoint of the charge mobility.

As the polymer charge transport material, known materials having charge transport properties, such as poly-N-vinylcarbazole and polysilane, can be used. Particularly, for example, a polyester-based polymer charge transport material is particularly preferable. The polymer charge transport material may be used alone or in combination of binder resins.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among these, for example, a polycarbonate resin or a polyarylate resin is preferable as the binder resin. These binder resins may be used alone or in combination of two or more kinds thereof.

The blending ratio between the charge transport material and the binder resin is, for example, preferably in a range of 10:1 to 1:5 in terms of the mass ratio.

The charge transport layer may also contain other known additives.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The film thickness of the charge transport layer is set to be, for example, preferably in a range of 5 μm or more and 50 μm or less and more preferably in a range of 10 μm or more and 30 μm or less.

Protective Layer

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)

2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], —$NH_2$, —SH, —COOH, and —$SiR^{Q1}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a group containing at least one selected from a vinyl group, a vinyl ether group, a vinyl thioether group, a vinylphenyl group, an acryloyl group, a methacryloyl group, or a derivative thereof. Among these, from the viewpoint of the excellent reactivity, examples of the chain polymerizable group include a group containing at least one selected from a vinyl group, a vinylphenyl group, an acryloyl group, a methacryloyl group, or a derivative thereof.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof.

In addition, the coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, an air knife coating method, and a curtain coating method.

The film thickness of the protective layer is set to be, for example, preferably in a range of 1 μm or more and 20 μm or less and more preferably in a range of 2 μm or more and 10 μm or less.

Single Layer Type Photosensitive Layer

The single layer type photosensitive layer (charge generation/charge transport layer) is, for example, a layer containing a charge generation material, a charge transport material, a binder resin, and as necessary, other known additives. These materials are the same as the materials described in the sections of the charge generation layer and the charge transport layer.

Further, the content of the charge generation material in the single layer type photosensitive layer may be, for example, 0.1% by mass or more and 10% by mass or less and preferably 0.8% by mass or more and 5% by mass or less with respect to the total solid content. In addition, the content of the charge transport material in the single layer type photosensitive layer may be, for example, 5% by mass or more and 50% by mass or less with respect to the total solid content.

The method of forming the single layer type photosensitive layer is the same as the method of forming the charge generation layer or the charge transport layer.

The film thickness of the single layer type photosensitive layer may be 5 μm or more and 50 μm or less, and is, for example, preferably 10 μm or more and 40 μm or less.

Configuration of Image Forming Apparatus (and Process Cartridge)

The image forming apparatus according to the present exemplary embodiment includes an image holder, a charging unit that charges the surface of the image holder, an electrostatic charge image forming unit that forms an electrostatic charge image on the charged surface of the image holder, a developing unit that accommodates an electrostatic charge image developer containing a toner having toner particles and develops the electrostatic charge image formed on the surface of the image holder as a toner image by using the electrostatic charge image developer, a transfer unit that transfers the toner image formed on the surface of the image holder to the surface of a recording medium, and a cleaning device having a cleaning blade that is brought into contact with and cleans an outer peripheral surface of the image holder.

As the image forming apparatus according to the present exemplary embodiment, known image forming apparatuses are applied which include an apparatus including transfer unit that transfers the toner image on the image holder onto the recording medium via the secondary transfer member (for example, secondary transfer belt); an apparatus including a fixing unit that fixes a toner image transferred to the surface of a recording medium; an apparatus including a cleaning device that cleans the surface of an image holder not yet being charged after transfer of a toner image; an apparatus including an electricity removing device that removes electricity by irradiating the surface of an image holder, the image holder not yet being charged, with electricity removing light after transfer of a toner image; an apparatus including an image holder heating member that raises the temperature of an image holder to reduce relative temperature, and the like.

The image forming apparatus according to the present exemplary embodiment may be any of a dry development type image forming apparatus or a wet development type (development type using a liquid developer) image forming apparatus.

In the image forming apparatus according to the present exemplary embodiment, for example, a portion including the image holder may be a cartridge structure (process cartridge) detachable from the image forming apparatus. As the process cartridge, for example, a process cartridge including a toner image forming device and a transfer device is preferably used.

Image Forming Method

An image forming method according to the present exemplary embodiment includes a charging step of charging a surface of an image holder, an electrostatic charge image forming step of forming an electrostatic charge image on the surface of the charged image holder, a developing step of developing the electrostatic charge image formed on the surface of the image holder as a toner image by the electrostatic charge image developer containing a toner having toner particles, a transfer step of transferring the toner image formed on the surface of the image holder to the surface of the recording medium, and a cleaning step of bringing a cleaning blade into contact with an outer peripheral surface of the image holder and cleaning the outer peripheral surface of the image holder.

In the toner particles, the release agent present in a region within 800 nm from a surface of the toner particles is 70% or more of the release agent in the entire toner particles and a melting temperature of the release agent is 65° C. or higher and 80° C. or lower.

The cleaning blade is constituted of a polyurethane resin. In the cleaning blade, the total amount of F and Si present within 200 nm from the surface which is brought into contact with the image holder accounts for 75% or more of a total amount of F and Si present within 5 μm from the surface.

Hereinafter, an example of the image forming apparatus and the image forming method according to the present exemplary embodiment will be described with reference to drawings. Here, the image forming apparatus and the image forming method according to the present exemplary embodiment are not limited thereto. Further, main parts shown in the figures will be described, but description of other parts will not be provided.

Figure 2:
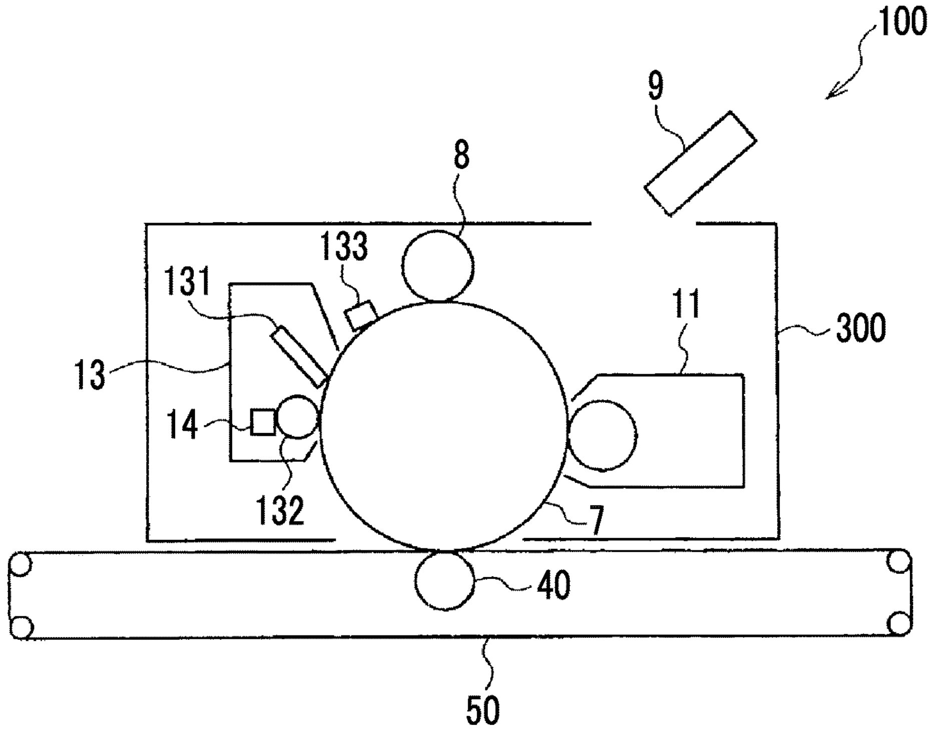
FIG. 2 is a schematic configuration view showing an example of an image forming apparatus according to the present exemplary embodiment.

FIG. 2 is a schematic configuration view showing an example of the image forming apparatus according to the present exemplary embodiment.

As shown in FIG. 2, an image forming apparatus 100 according to the present exemplary embodiment includes a process cartridge 300 including an electrophotographic photoreceptor 7 (an example of the image holder), an exposure device 9 (an example of an electrostatic charge image forming unit), a transfer device 40 (primary transfer device), and an intermediate transfer member 50. In the image forming apparatus 100, the exposure device 9 is disposed at a position that can be exposed to the electrophotographic photoreceptor 7 from an opening portion of the process cartridge 300, the transfer device 40 is disposed at a position that faces the electrophotographic photoreceptor 7 via the intermediate transfer member 50, and the intermediate transfer member 50 is disposed such that a part of the intermediate transfer member 50 is in contact with the electrophotographic photoreceptor 7. Although not shown, the image forming apparatus also includes a secondary transfer device that transfers the toner image transferred to the intermediate transfer member 50 to a recording medium (for example, paper). The intermediate transfer member 50, the transfer device 40 (primary transfer device), and the secondary transfer device (not shown) correspond to an example of the transfer unit.

The process cartridge 300 in FIG. 2 integrally supports the electrophotographic photoreceptor 7, a charging device 8 (an example of the charging unit), a developing device 11 (an example of the developing unit), and the cleaning device 13 in a housing. The cleaning device 13 has a cleaning blade 131, and the cleaning blade 131 is disposed to come into contact with the surface of the electrophotographic photoreceptor 7. The cleaning member may be a conductive or insulating fibrous member instead of the aspect of the cleaning blade 131, and may be used alone or in combination with the cleaning blade 131.

FIG. 2 shows an example of an image forming apparatus including a fibrous member 132 (roll shape) that supplies a lubricant 14 to the surface of the electrophotographic photoreceptor 7 and a fibrous member 133 (flat brush shape) that assists cleaning, but these are disposed as necessary.

Hereinafter, each configuration of the image forming apparatus according to the present exemplary embodiment will be described.

Charging Device

As the charging device 8, for example, a contact-type charger formed of a conductive or semi-conductive charging roller, a charging brush, a charging film, a charging rubber blade, a charging tube, or the like is used. In addition, a known charger such as a non-contact type roller charger, or a scorotron charger or a corotron charger using corona discharge is also used.

Exposure Device

Examples of the exposure device 9 include an optical system device that exposes the surface of the electrophotographic photoreceptor 7 to light such as a semiconductor laser beam, LED light, and liquid crystal shutter light in a predetermined image pattern. The wavelength of the light source is within the spectral sensitivity region of the electrophotographic photoreceptor. As the wavelength of a semiconductor laser, near infrared, which has an oscillation wavelength in the vicinity of 780 nm, is mostly used. However, the wavelength is not limited thereto, and a laser having an oscillation wavelength of approximately 600 nm or a laser having an oscillation wavelength of 400 nm or more and 450 nm or less as a blue laser may also be used. In addition, a surface emission type laser light source capable of outputting a multi-beam is also effective for forming a color image.

Developing Device

Examples of the developing device 11 include a typical developing device that performs development in contact or non-contact with the developer. The developing device 11 is not particularly limited as long as the developing device has the above-described functions, and is selected depending on the purpose thereof. Examples of the developing device include known developing machines having a function of attaching a one-component developer or a two-component developer to the electrophotographic photoreceptor 7 using a brush, a roller, or the like. Among these, for example, a developing device formed of a developing roller having a surface on which a developer is held is preferably used.

The developer used in the developing device 11 may be a one-component developer containing only a toner or a two-component developer containing a toner and a carrier. In addition, the developer may be magnetic or non-magnetic. Known developers are employed as these developers.

Cleaning Device

As the cleaning device 13, a cleaning blade type device including the cleaning blade 131 is used.

Transfer Device

Examples of the transfer device 40 include a known transfer charger such as a contact type transfer charger using a belt, a roller, a film, or a rubber blade, a scorotron transfer charger, or a corotron transfer charger using corona discharge.

Intermediate Transfer Member

As the intermediate transfer member 50, a belt-like intermediate transfer member (intermediate transfer belt) containing semi-conductive polyimide, polyamide-imide, polycarbonate, polyarylate, polyester, rubber, or the like is used. In addition, as the form of the intermediate transfer member, a drum-like intermediate transfer member may be used in addition to the belt-like intermediate transfer member.

Figure 3:
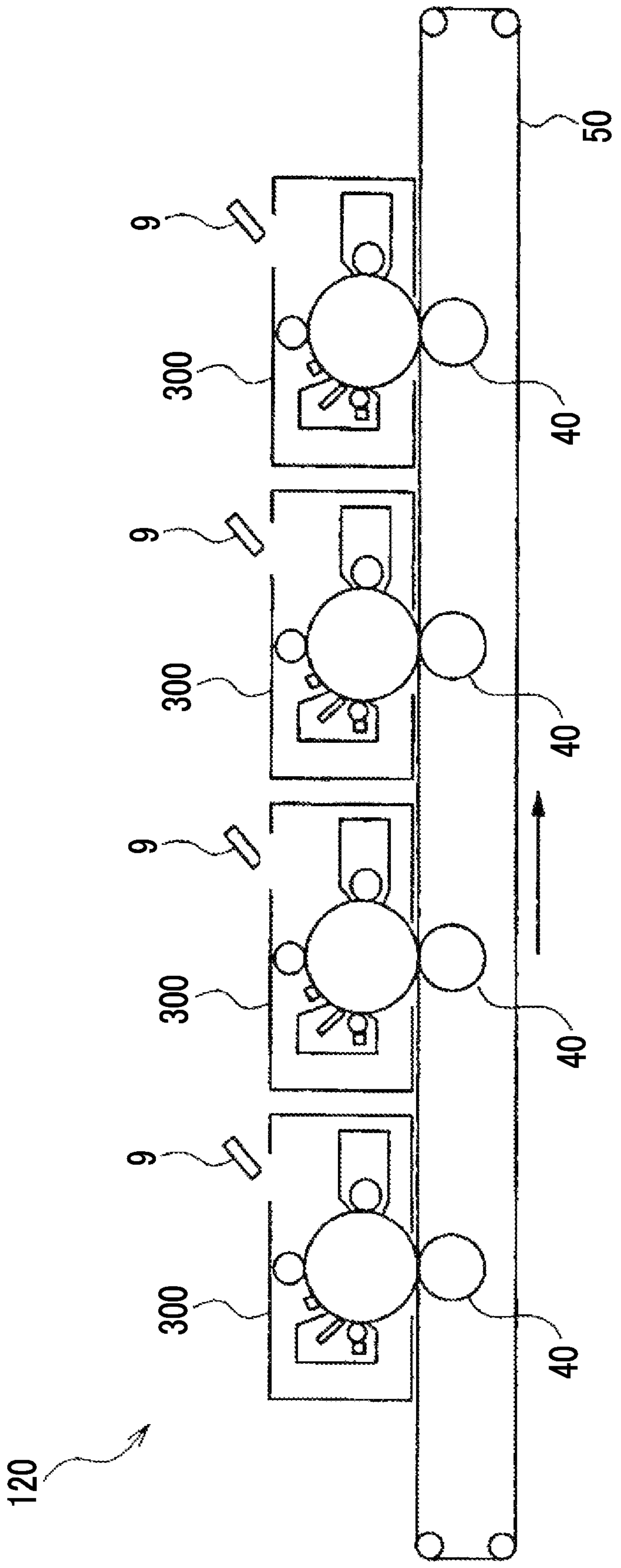
FIG. 3 is a schematic configuration view showing another example of the image forming apparatus according to the present exemplary embodiment.

FIG. 3 is a schematic configuration view showing another example of the image forming apparatus according to the present exemplary embodiment.

An image forming apparatus 120 shown in FIG. 3 is a tandem type multicolor image forming apparatus on which four process cartridges 300 are mounted. The image forming apparatus 120 is formed such that four process cartridges 300 are arranged in parallel on the intermediate transfer member 50, and one electrophotographic photoreceptor is used for each color. The image forming apparatus 120 has the same configuration as the image forming apparatus 100 except that the image forming apparatus 120 is of a tandem type.

Hitherto, the present exemplary embodiment has been described. However, the present exemplary embodiment is not limited to the above exemplary embodiments, and various modifications, changes, and ameliorations can be added thereto.

EXAMPLES

Examples of the present disclosure will be described below, but the present disclosure is not limited to the following examples. In the following description, all "parts" and "%" are in terms of mass unless otherwise specified.

Example 1

Preparation of Electrostatic Charge Image Developer

Preparation of Amorphous Polyester Resin Dispersion

Preparation of Polyester Resin Dispersion (APE1)

Terephthalic acid: 30 parts by mole

Fumaric acid: 70 parts by mole

Ethylene oxide adduct of bisphenol A: 5 parts by mole

Propylene oxide adduct of bisphenol A: 95 parts by mole

The above materials are put in a flask with an inner capacity of 5 liter equipped with a stirrer, a nitrogen introduction tube, a temperature sensor, and a rectifying column, the temperature is raised to 210° C. for an hour, and titanium tetraethoxide is added thereto in an amount of 1 part with respect to 100 parts of the above materials. While the generated water is being distilled off, the temperature is raised to 230° C. for 0.5 hours, a dehydration condensation reaction is continued for 1 hour at 230° C., and then the reactant is cooled. In this manner, a polyester resin having a weight-average molecular weight of 18,500, an acid value of 14 mgKOH/g, and a glass transition temperature of 59° C. is synthesized.

Ethyl acetate (40 parts) and 25 parts of 2-butanol are put in a container equipped with a temperature control unit and a nitrogen purge unit, thereby preparing a mixed solvent. Then, 100 parts of the polyester resin is slowly added to and dissolved in the solvent, a 10% by mass aqueous ammonia solution (in an amount equivalent to 3 times the acid value of the resin in terms of molar ratio) is added thereto, and the mixed solution is stirred for 30 minutes.

Thereafter, the container is cleaned out by dry nitrogen purging, and in a state where the mixed solution is being stirred at a temperature kept at 40° C., 400 parts of deionized water is added dropwise thereto at a rate of 2 parts/min such that the mixed solution is emulsified. After the dropwise addition ends, the temperature of the emulsion is returned to room temperature (20° C. to 25° C.), and bubbling is performed under stirring for 48 hours by using dry nitrogen, thereby obtaining a resin particle dispersion in which the concentration of ethyl acetate and 2-butanol is reduced to 1,000 ppm or less and the resin particles having the volume-average particle size of 200 nm is dispersed. Deionized water is added to the resin particle dispersion, and the solid content thereof is adjusted to 20% by mass, thereby obtaining a polyester resin particle dispersion (APE1).

Preparation of Colorant Particle Dispersion

Preparation of Colorant Particle Dispersion (Black Pigment Dispersion)

Carbon black (Regal 330, manufactured by Cabot Corporation): 250 parts

Anionic surfactant (NEOGEN SC, manufactured by DKS Co. Ltd.): 33 parts (60% of active ingredient, 8% with respect to colorant)

Deionized water: 750 parts 280 parts of deionized water and 33 parts of anionic surfactant are placed in a stainless steel container having a size such that the height of the liquid surface becomes about ⅓ of the height of the container in a case where all the above components are put therein. After the surfactant is sufficiently dissolved, all the solid solution pigments are added, and the mixture is stirred using a stirrer until the non-wet pigment disappears, and sufficiently defoamed. After defoaming, the remaining deionized water is added, and the mixture is dispersed at 5,000 rpm for 10 minutes using a homogenizer (T50 ULTRA-TURRAX manufactured by IKA), and then defoamed by stirring with a stirrer for 1 day and night. After defoaming, the mixture is dispersed again at 6,000 rpm for 10 minutes using the homogenizer, and then defoamed by stirring with a stirrer for 1 day and night. Subsequently, the dispersion is dispersed at a pressure of 240 MPa using a high-pressure impact disperser Ultimizer (HJP30006, manufactured by SUGINO MACHINE LIMITED CO., LTD.).

Dispersion is performed corresponding to 25 passes in terms of the total charge amount and the processing capacity of the apparatus. The obtained dispersion is left to stand for 72 hours to remove a precipitate, and deionized water is added to adjust the solid content concentration to 15%, thereby obtaining a colorant particle dispersion. The volume-average particle size D50 of the particles in the colorant particle dispersion is 135 nm.

Preparation of Release Agent Dispersion

Preparation of Release Agent Dispersion (WAX1)

Paraffin-based wax (manufactured by NIPPON SEIRO CO., LTD., HNP9, melting temperature of 75° C.): 270 parts Anionic surfactant (manufactured by DKS Co. Ltd., NEOGEN RK, amount of active ingredient: 60%): 13.5 parts (as active ingredient, 3.0% with respect to release agent)

Deionized water: 21.6 parts

The above components are mixed, subjected to a dispersion treatment at a dispersion pressure of 5 MPa for 120 minutes and further at 40 MPa for 360 minutes with a pressure discharge type homogenizer (Gaulin homogenizer, manufactured by Gaulin) after a release agent is dissolved at an internal fluid temperature of 120° C., and cooled, thereby obtaining a release agent dispersion (WAX1). The volume-average particle size D50 of the particles in the release agent dispersion (WAX1) is 225 nm. Then, deionized water is added to adjust the solid content concentration to 20.0%.

Preparation of Mixed Particle Dispersion

Preparation of Mixed Particle Dispersion (RW1)

After mixing 150 parts of the polyester resin particle dispersion (APE1), 20 parts of the release agent particle dispersion (WAX1), and 2.9 parts of an anionic surfactant (Dowfax2A1 manufactured by The Dow Chemical Company), pH of the mixture is adjusted to 3.0 by adding 1.0% nitric acid under a temperature of 25° C., thereby obtaining the mixed particle dispersion (RW1).

Preparation of Toner

Polyester resin particle dispersion (APE1): 700 parts

Colorant particle dispersion: 133 parts

Deionized water: 400 parts

Anionic surfactant (Dowfax2A1 manufactured by The Dow Chemical Company): 2.9 parts The above components are placed in a 3 liter reaction container equipped with a thermometer, a pH meter, and a stirrer, and pH of the components is adjusted to 3.0 by adding 1.0% nitric acid at a temperature of 25° C. Then while dispersing at 5,000 rpm using a homogenizer (manufactured by IKA Japan: T50 ULTRA-TURRAX), 130 parts of the prepared aqueous aluminum sulfate solution is added and dispersed for 6 minutes.

Then, a stirrer and a mantle heater are installed in the reaction container, and while the rotation speed of the stirrer is adjusted such that the slurry is sufficiently stirred, the solution is heated at a temperature rising rate of 0.2° C./min up to a temperature of 40° C. and at a temperature rising rate of 0.05° C./min after exceeding 40° C., and the particle size is measured every 10 minutes with Multisizer II (aperture size: 50 μm, manufactured by Beckman Coulter Inc.). The reaction container is kept at the temperature at which the volume-average particle size has reached 5.0 μm, and 450 parts of the mixed particle dispersion (RW1) is added thereto for 5 minutes. After holding for 30 minutes, the pH is adjusted to 9.0 using a 1% aqueous sodium hydroxide solution. Then, the temperature is raised to 90° C. at a heating rate of 1° C./min and maintained at 98° C. while adjusting the pH to 9.0 at every 5° C. in the same manner. As a result of observing the shape and surface properties of the particles with an optical microscope and a scanning electron microscope (FE-SEM), the coalescence of the particles is confirmed after 10.0 hours. Therefore, the container is cooled to 30° C. for 5 minutes with cooling water.

The cooled slurry is allowed to pass through a nylon mesh having a mesh opening of 15 μm to remove coarse powder, and the toner slurry that has passed through the mesh is vacuum-filtered with an aspirator. The toner remaining on the filter paper is finely crushed by hand, added to deionized water in an amount of 10 times the toner at a temperature of 30° C., and the solution is mixed by being stirred for 30 minutes. Then, the solution is vacuum-filtered with an aspirator, the toner remaining on the filter paper is finely crushed by hand and added to deionized water in an amount of 10 times the toner at a temperature of 30° C., and the solution is mixed by being stirred for 30 minutes and vacuum-filtered with an aspirator again, and the electrical conductivity of the filtrate is measured. This operation is repeated until the electrical conductivity of the filtrate becomes 10 μS/cm or less, and the toner are washed. The washed toner is finely crushed with a wet dry granulator (Comil) and vacuum-dried in an oven at 35° C. for 36 hours, thereby obtaining toner particles.

Then, 3.3 parts of silica particles are added as an external additive to 100 parts of toner particles. Next, the mixture is mixed at a peripheral speed of 30 m/s for 3 minutes using a Henschel mixer. Then, the mixture is sieved using a vibration sieve having an opening size of 45 μm, thereby obtaining a toner.

Production of Carrier 500 parts of spherical magnetite particle powder having a volume-average particle size of 0.18 μm is added to a Henschel mixer, and sufficiently stirred. Then, 5 parts of a titanate-based coupling agent is added, the temperature is raised to 95° C., and the mixture is mixed and stirred for 30 minutes. As a result, spherical magnetite particles coated with a titanate-based coupling agent are obtained.

Subsequently, 6 parts of phenol, 10 parts of 30% formalin, 500 parts of the magnetite particles, 7 parts of 25% ammonia water, and 400 parts of water are added to a 1 L four-neck flask and mixed and stirred. Next, the temperature is raised to 90° C. in 60 minutes with stirring, the reaction is carried out at the same temperature for 180 minutes, the temperature is cooled to 30° C., 500 ml of water is added, the supernatant is then removed, and the precipitate is washed with water. The precipitate is dried at 180° C. under reduced pressure, and coarse powder is removed by a sieving net having an opening of 106 μm to obtain core material particles having an average particle size of 38 μm.

Next, 200 parts of toluene and 35 parts of a styrene-methylmethacrylate copolymer (component molar ratio of 10:90, weight-average molecular weight of 160,000) are stirred for 90 minutes with a stirrer to obtain a coated resin solution.

1,000 parts of core material particles and 70 parts of a coated resin solution are placed in a vacuum degassing type kneader coater (clearance between rotor and wall surface of 35 mm), and the mixture is stirred at 30 rpm for 30 minutes while maintaining 65° C. Then, the temperature is set to 88° C., the pressure is reduced, and toluene distillation, degassing, and drying are performed. Next, the resultant is passed a mesh having an opening of 75 μm. The shape factor SF2 of the carrier is 104.

Production of Developer 8 parts of the toner and 100 parts of the carrier are mixed together by using a V blender, thereby producing a developer.

Toner Physical Properties

The ratio (surface layer ratio of the release agent) of the release agent present in the region within 800 nm from the surface of the toner particles to the release agent in the entire toner particles is measured by the above-mentioned method. In addition, the melting temperature of the release agent is measured by the above-mentioned method.

Production of Cleaning Blade 100 parts by mass of polycaprolactone polyol (molecular weight of 2000) as a high-molecular-weight polyol component reacts with 58 parts by mass of 4,4'-diphenylmethane diisocyanate (MDI: manufactured by DIC Corporation) as a polyisocyanate component at 115° C. for 20 minutes. Thereafter, 6.1 parts by mass of 1,4-butanediol and 2.6 parts by mass of trimethylolpropane as low-molecular-weight polyol components are mixed, and heated and cured in a mold maintained at 140° C. for 40 minutes. The mixture is molded, a rubber elastic member that is cut-processed into a shape with a width of 14 mm, a thickness of 1.9 mm, and a length of 330 mm is obtained, and this rubber elastic member adheres to a support plate, thereby obtaining a blade base material.

80 parts by mass of ethyl acetate as an organic solvent, 25 parts by mass of 4,4'-diphenylmethane diisocyanate (MDI: "MILLIONATE MT" manufactured by Tosoh Corporation, melting point: 38° C.) as an isocyanate compound, and 5 parts by mass of a silicone-modified acrylic polymer (8BS-9000, manufactured by Taisei Fine Chemical Co., Ltd.) as an acrylic polymer having a siloxane bond which is a specific polymer are dispersed and mixed with a ball mill for 5 hours, thereby obtaining a surface treatment liquid.

The blade base material is immersed in the surface treatment liquid for 60 seconds while the surface treatment liquid is maintained at 23° C., and dried in an environment of room temperature (25° C.) for 1 minute. Next, the surface of the dried blade base material is subjected to finish wiping with a sponge containing a small amount of toluene, further dried in an environment of 25° C. for 1 minute, and heated in an oven maintained at 25° C. for 50 minutes, thereby obtaining a cleaning blade.

Cleaning Blade Physical Properties

In the cleaning blade, a ratio (surface layer ratio of F and Si) of the total amount of F and Si present within 200 nm from the surface which is brought in contact with the image holder to the total amount of F and Si present within 5 μm from the surface, the total amount of F and Si (amount of surface F and Si (atm %)) present on the surface which is brought in contact with the image holder, total amount of F and Si (amount of 50 nm position F and Si (atm %)) present at a position of 50 nm from the surface which is brought into contact with the image holder, and 100% modulus (MPa) are measured by the above-mentioned method.

Preparation of Photoreceptor

As the polyester resin (1), a polyester resin (PE1) formed of 50% by mole of the dicarboxylic acid unit (A2-3) and 50% by mole of the diol unit (B1-4) and having a weight-average molecular weight of 50,000 is prepared.

Formation of Undercoat Layer

An aluminum cylindrical tube having an outer diameter of 30 mm, a length of 250 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmφ glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer. The average thickness of the undercoat layer is 25 μm.

Formation of Charge Generation Layer

A mixture of 15 parts of hydroxygallium phthalocyanine as a charge generation material (having diffraction peaks at positions where Bragg angles (2θ±0.2°) in the X-ray diffraction spectrum using Cukα characteristic X-rays are at least of 7.5°, 9.9°, 12.5, 16.3°, 18.6°, 25.1°, and 28.3°), 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid, and the mixture is stirred, thereby obtaining a coating solution for forming a charge generation layer. The undercoat layer is immersed in and coated with the coating solution for forming a charge generation layer, and dried at room temperature (25° C.±3° C.) to form a charge generation layer having an average thickness of 0.18 μm.

Formation of Charge Transport Layer 60 parts of the polyester resin (PE1) as a binder resin and 40 parts of CTM-1 as a charge transport material are dissolved in 270 parts of tetrahydrofuran and 30 parts of toluene, thereby obtaining a coating solution for forming a charge transport layer. The charge generation layer is immersed in and coated with the coating solution for forming a charge transport layer, and dried at 145° C. for 30 minutes to form a charge transport layer having an average thickness of 40 μm.

CTM-1

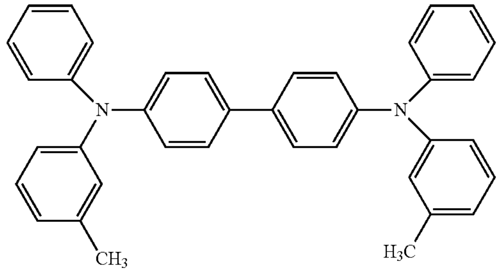

Image Forming Apparatus

The electrostatic charge image developer, the photoreceptor, and the cleaning blade for photoreceptor, which are obtained above, are mounted on an image forming apparatus "Apeos C-8180 manufactured by FUJIFILM Business Innovation Corp.".

Examples 2 to 19 and Comparative Examples 1 and 2

Preparation of Electrostatic Charge Image Developer

In Example 1, the release agent used for preparing the release agent dispersion is selected, and the amount of the mixed particle dispersion (RW1) at the time of preparing the toner is adjusted. Therefore, toner particles satisfying "the surface layer ratio (%) of the release agent" and "the melting temperature of the release agent (° C.)", which are described in Tables 1 and 2, are prepared, thereby obtaining an electrostatic charge image developer.

As the release agent having the melting temperature shown in Table 1, the following agents are used alone or in combination.

Paraffin-based wax (manufactured by NIPPON SEIRO CO., LTD., melting temperature of 64° C.)

Ester-based wax (manufactured by NOF Corporation, melting temperature of 82° C.) Production of Cleaning Blade The amount of 4,4'-diphenylmethane diisocyanate (MDI: "MILLIONATE MT" manufactured by Tosoh Corporation, melting point: 38° C.) in a case of forming the cleaning blade in Example 1 is changed to the amount shown in Table 1. In addition, on the obtained blade base material, the composition of the surface treatment liquid used for the surface modification treatment for the contact portion and the conditions of the surface heat treatment are changed as described in Table 1, and the cleaning blade satisfying the "surface layer ratio (%) of F and Si", "amount of surface F and Si (atm %)", "amount of 50 nm position F and Si (atm %)", and "100% modulus (MPa)", which are shown in Table 2, is produced. In addition, the pressing force NF (gf/mm), the pressing angle WA (°), and NF×WA in a case of mounting the obtained cleaning blade on the image forming apparatus are set as the conditions shown in Table 2.

The following components are used as the components of the surface treatment liquid shown in Table 1.

Silicone-modified acrylic polymer (8BS-9000, manufactured by Taisei Fine Chemical Co., Ltd.)

Fluorine-silicone-modified acrylic polymer (8FS-009, manufactured by Taisei Fine Chemical Co., Ltd.)

Isocyanate compound (MDI: "MILLIONATE MT" manufactured by Tosoh Corporation, melting point: 38° C.)

Evaluation Test

Using the image forming apparatus prepared in each of Examples and Comparative Examples, 50,000 sheets of images with an image density of 0.5% are output on A4 paper in a room-temperature and low-humidity environment (21° C., 10%). The image quality after output and the cleaning blade are evaluated according to the following criteria.

Filming

The observed image of the surface of the photoreceptor, 100 μm square, is binarized, the area ratio occupied by the deposits is determined, and the evaluation is performed according to the following criteria.

Criteria

A: Filming is not occurred.

B: The external additive filming has slightly occurred, at a sufficiently acceptable level in practical use.

C: The filming has occurred, at an acceptable level in practical use.

D: The filming has occurred, at an unacceptable level in practical use.

E: The filming has frequently occurred, at an unacceptable level in practical use.

Blade Wear

A depth of the wear of the contact portion of the cleaning blade is measured by observing a cross-sectional profile with a laser microscope VK-9500 manufactured by KEYENCE Corporation.

Criteria

The wear depth of the cleaning blade is measured and evaluated according to the following criteria.

A: Wear depth<0.5 μm

B: 0.5 μm≤wear depth<1.0 μm

C: 1.0 μm≤wear depth<1.5 μm

D: 1.5 μm≤wear depth<2.0 μm

E: 2.0 μm≤wear depth<2.5 μm

TABLE 1

| | | Toner | | Cleaning blade | | | | | | | |
|---|---|---|---|---|---|---|---|---|---|---|---|
| | | | | | Surface treatment liquid | | | | | | |
| | | Surface layer ratio (%) of release agent | Melting temperature (° C.) of release agent | Base material MDI (part by mass) | Silicone-modified acrylic polymer (part by mass) | Fluorine-silicone-modified acrylic polymer (part by mass) | Isocyanate compound (part by mass) | Ethyl acetate (part by mass) | Surface heat treatment Temperature (° C.) | Surface heat treatment Time (minute) |
| Example | 1 | 75 | 75 | 58 | 5 | 0 | 25 | 80 | 25 | 50 |
| | 2 | 75 | 75 | 58 | 0 | 5 | 25 | 80 | 25 | 50 |
| | 3 | 75 | 75 | 58 | 0 | 5 | 25 | 80 | 25 | 10 |
| | 4 | 75 | 75 | 58 | 4 | 0 | 25 | 80 | 25 | 50 |
| | 5 | 75 | 75 | 58 | 4 | 0 | 25 | 80 | 15 | 50 |
| | 6 | 75 | 75 | 58 | 10 | 0 | 25 | 80 | 15 | 50 |
| | 7 | 75 | 75 | 58 | 4 | 0 | 25 | 80 | 15 | 25 |
| | 8 | 75 | 70 | 58 | 5 | 0 | 25 | 80 | 25 | 50 |
| | 9 | 75 | 69 | 58 | 5 | 0 | 25 | 80 | 25 | 50 |
| | 10 | 75 | 65 | 58 | 5 | 0 | 25 | 80 | 25 | 50 |
| | 11 | 75 | 80 | 58 | 5 | 0 | 25 | 80 | 25 | 50 |
| | 12 | 75 | 75 | 61.5 | 5 | 0 | 25 | 80 | 25 | 50 |
| | 13 | 75 | 75 | 51 | 5 | 0 | 25 | 80 | 25 | 50 |
| | 14 | 75 | 75 | 63 | 5 | 0 | 25 | 80 | 25 | 50 |
| | 15 | 75 | 75 | 50 | 5 | 0 | 25 | 80 | 25 | 50 |
| | 16 | 75 | 75 | 58 | 0 | 5 | 25 | 80 | 25 | 50 |
| | 17 | 75 | 75 | 58 | 0 | 5 | 25 | 80 | 25 | 50 |
| | 18 | 75 | 75 | 58 | 5 | 0 | 25 | 80 | 25 | 50 |
| | 19 | 75 | 75 | 58 | 5 | 0 | 25 | 80 | 25 | 50 |
| Comparative | 1 | 70 | 64 | 58 | 2 | 0 | 15 | 80 | 25 | 30 |
| Example | 2 | 70 | 82 | 58 | 0 | 2 | 15 | 80 | 25 | 30 |

TABLE 2

| | | Cleaning blade Physical properties | | | | | | | | |
|---|---|---|---|---|---|---|---|---|---|---|
| | | Surface layer ratio of F and Si (%) | Amount of surface F and Si (atm %) | Amount of 50 nm position F and Si (atm %) | 100% modulus (MPa) | Pressing force NF (gf/mm) | Pressing angle WA (°) | NF × WA | Evaluation result Filming | Evaluation result Wear |
| Example | 1 | 87 | 18.5 | 1.5 | 18 | 4 | 14 | 56 | A | A |
| | 2 | 85 | 18.1 | 1.3 | 18 | 4 | 14 | 56 | A | A |
| | 3 | 75 | 18.1 | 1.3 | 18 | 4 | 14 | 56 | B | B |
| | 4 | 85 | 15.8 | 1 | 18 | 4 | 14 | 56 | A | B |
| | 5 | 85 | 14.5 | 1 | 18 | 4 | 14 | 56 | A | C |
| | 6 | 95 | 25.2 | 2.2 | 18 | 4 | 14 | 56 | B | A |
| | 7 | 80 | 15.1 | 0.7 | 18 | 4 | 14 | 56 | B | C |
| | 8 | 85 | 18.5 | 1.5 | 18 | 4 | 14 | 56 | A | A |
| | 9 | 85 | 18.5 | 1.5 | 18 | 4 | 14 | 56 | B | A |
| | 10 | 85 | 18.5 | 1.5 | 18 | 4 | 14 | 56 | C | A |
| | 11 | 85 | 18.5 | 1.5 | 18 | 4 | 14 | 56 | B | A |
| | 12 | 85 | 18.5 | 1.4 | 22 | 4 | 14 | 56 | B | A |
| | 13 | 85 | 18.5 | 1.6 | 11 | 4 | 14 | 56 | A | B |

TABLE 2-continued

| | | Cleaning blade Physical properties | | | | | | | | |
|---|---|---|---|---|---|---|---|---|---|---|
| | | Surface layer ratio of F and Si (%) | Amount of surface F and Si (atm %) | Amount of 50 nm position F and Si (atm %) | 100% modulus (MPa) | Pressing force NF (gf/mm) | Pressing angle WA (°) | NF × WA | Evaluation result Filming | Wear |
| | 14 | 85 | 18.5 | 1.2 | 23 | 4 | 14 | 56 | C | B |
| | 15 | 85 | 18.5 | 1.6 | 10 | 4 | 14 | 56 | B | C |
| | 16 | 85 | 18.1 | 1.5 | 18 | 5 | 12 | 60 | A | A |
| | 17 | 85 | 18.1 | 1.5 | 18 | 2.5 | 16 | 40 | A | A |
| | 18 | 85 | 18.5 | 1.5 | 18 | 4.5 | 14 | 63 | A | C |
| | 19 | 85 | 18.5 | 1.5 | 18 | 3 | 13 | 39 | C | A |
| Comparative | 1 | 73 | 14.2 | 0.1 | 18 | 4 | 14 | 56 | D | D |
| Example | 2 | 72 | 14.0 | 0.1 | 18 | 4 | 14 | 56 | D | D |

As shown in Tables 1 and 2, in the image forming apparatus of the present example, compared to the comparative examples, the occurrence of toner filming on the surface of the photoreceptor is suppressed and wear in the cleaning blade is suppressed.

The present exemplary embodiment includes the following aspects.

(((1)))

An image forming apparatus comprising:

an image holder;

a charging unit that charges a surface of the image holder;

an electrostatic charge image forming unit that forms an electrostatic charge image on the charged surface of the image holder;

a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower;

a transfer unit that transfers the toner image formed on the surface of the image holder to a surface of a recording medium; and a cleaning device having a cleaning blade that is brought into contact with and cleans an outer peripheral surface of the image holder and that is constituted of a polyurethane resin, in which a total amount of F and Si present within 200 nm from a surface of the cleaning blade, which is brought into contact with the image holder, accounts for 75% or more of a total amount of F and Si present within 5 μm from the surface.

(((2)))

The image forming apparatus according to (((1))), wherein the release agent present in the region within 800 nm from the surface of the toner particles is 75% or more of the release agent in the entire toner particles.

(((3)))

The image forming apparatus according to (((1))) or (((2))), wherein the melting temperature of the release agent is 70° C. or higher and 75° C. or lower.

(((4)))

The image forming apparatus according to any one of (((1))) to (((3))), wherein a 100% modulus at 23° C. on the surface of the cleaning blade, which is brought into contact with the image holder, is 11 MPa or more and 22 MPa or less.

(((5)))

The image forming apparatus according to (((4))), wherein the 100% modulus at 23° C. on the surface of the cleaning blade, which is brought into contact with the image holder, is 15 MPa or more and 18 MPa or less.

(((6)))

The image forming apparatus according to any one of (((1 to wherein the total amount of F and Si present within 200 nm from the surface of the cleaning blade, which is brought into contact with the image holder, accounts for 85% or more of the total amount of F and Si present within 5 μm from the surface.

(((7)))

The image forming apparatus according to any one of (((1))) to (6)

wherein a total amount of F and Si present on the surface of the cleaning blade, which is brought into contact with the image holder, is 15 atm % or more.

(((8)))

The image forming apparatus according to (((7))), wherein the total amount of F and Si present on the surface of the cleaning blade, which is brought into contact with the image holder, is 18 atm % or more and 25 atm % or less.

(((9)))

The image forming apparatus according to any one of (((1))) to (((8))

wherein a total amount of F and Si present at a position of 50 nm from the surface of the cleaning blade, which is brought into contact with the image holder, is 0.3 atm % or more.

(((10))

The image forming apparatus according to (((9))), wherein the total amount of F and Si present at the position of 50 nm from the surface of the cleaning blade, which is brought into contact with the image holder, is 1.0 atm % or more and 2.0 atm % or less.

(((11)))

The image forming apparatus according to any one of (((1))) to (((10))), wherein the cleaning blade contains a silicone-based polymer in a surface layer which is brought into contact with the image holder.

(((12)))

The image forming apparatus according to any one of (((1))) to (11))), wherein a product of a static pressing force NF and a pressing angle WA between the cleaning blade and the image holder is 40 or more and 60 or less.

(((13)))

An image forming method comprising:

charging a surface of an image holder;

forming an electrostatic charge image on the charged surface of the image holder;

developing an electrostatic charge image formed on the surface of the image holder as a toner image by an electrostatic charge image developer containing a toner having toner particles, in which a release agent present in a region within 800 nm from a surface of the toner particles is 70% or more of a release agent in entire toner particles and a melting temperature of the release agent is 65° C. or higher and 80° C. or lower;

transferring the toner image formed on the surface of the image holder to a surface of a recording medium; and bringing a cleaning blade into contact with an outer peripheral surface of the image holder and cleaning the outer peripheral surface of the image holder, the cleaning blade being constituted of a polyurethane resin, in which a total amount of F and Si present within 200 nm from the surface of the cleaning blade, which is brought into contact with the image holder, accounts for 75% or more of a total amount of F and Si present within 5 μm from the surface.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an image holder;

a charging unit that charges a surface of the image holder;

an electrostatic charge image forming unit that forms an electrostatic charge image on the charged surface of the image holder;

a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower;

a transfer unit that transfers the toner image formed on the surface of the image holder to a surface of a recording medium; and a cleaning device having a cleaning blade that is brought into contact with and cleans an outer peripheral surface of the image holder and that is constituted of a polyurethane resin, in which a total amount of F and Si present within 200 nm from a surface of the cleaning blade, which is brought into contact with the image holder, accounts for 75% or more of a total amount of F and Si present within 5 μm from the surface.

2. The image forming apparatus according to claim 1, wherein the release agent present in the region within 800 nm from the surface of the toner particles is 75% or more of the release agent in the entire toner particles.

3. The image forming apparatus according to claim 1, wherein the melting temperature of the release agent is 70° C. or higher and 75° C. or lower.

4. The image forming apparatus according to claim 1, wherein a 100% modulus at 23° C. on the surface of the cleaning blade, which is brought into contact with the image holder, is 11 MPa or more and 22 MPa or less.

5. The image forming apparatus according to claim 4, wherein the 100% modulus at 23° C. on the surface of the cleaning blade, which is brought into contact with the image holder, is 15 MPa or more and 18 MPa or less.

6. The image forming apparatus according to claim 1, wherein the total amount of F and Si present within 200 nm from the surface of the cleaning blade, which is brought into contact with the image holder, accounts for 85% or more of the total amount of F and Si present within 5 μm from the surface.

7. The image forming apparatus according to claim 1, wherein a total amount of F and Si present on the surface of the cleaning blade, which is brought into contact with the image holder, is 15 atm % or more.

8. The image forming apparatus according to claim 7, wherein the total amount of F and Si present on the surface of the cleaning blade, which is brought into contact with the image holder, is 18 atm % or more and 25 atm % or less.

9. The image forming apparatus according to claim 1, wherein a total amount of F and Si present at a position of 50 nm from the surface of the cleaning blade, which is brought into contact with the image holder, is 0.3 atm % or more.

10. The image forming apparatus according to claim 9, wherein the total amount of F and Si present at the position of 50 nm from the surface of the cleaning blade, which is brought into contact with the image holder, is 1.0 atm % or more and 2.0 atm % or less.

11. The image forming apparatus according to claim 1, wherein the cleaning blade contains a silicone-based polymer in a surface layer which is brought into contact with the image holder.

12. The image forming apparatus according to claim 1, wherein a product of a static pressing force NF and a pressing angle WA between the cleaning blade and the image holder is 40 or more and 60 or less.

13. An image forming method comprising:

charging a surface of an image holder;

forming an electrostatic charge image on the charged surface of the image holder;

developing an electrostatic charge image formed on the surface of the image holder as a toner image by an electrostatic charge image developer containing a toner having toner particles, in which a release agent present in a region within 800 nm from a surface of the toner particles is 70% or more of a release agent in entire toner particles and a melting temperature of the release agent is 65° C. or higher and 80° C. or lower;

transferring the toner image formed on the surface of the image holder to a surface of a recording medium; and bringing a cleaning blade into contact with an outer peripheral surface of the image holder and cleaning the outer peripheral surface of the image holder, the cleaning blade being constituted of a polyurethane resin, in which a total amount of F and Si present within 200 nm from the surface of the cleaning blade, which is brought into contact with the image holder, accounts for 75% or more of a total amount of F and Si present within 5 μm from the surface.

14. An image forming apparatus comprising:

an image holder;

charging means for charging a surface of the image holder;

an electrostatic charge image forming means that forms an electrostatic charge image on the charged surface of the image holder;

developing means for accommodating an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower;

a transfer unit that transfers the toner image formed on the surface of the image holder to a surface of a recording medium; and a cleaning device having a cleaning blade that is brought into contact with and cleans an outer peripheral surface of the image holder and that is constituted of a polyurethane resin, in which a total amount of F and Si present within 200 nm from a surface of the cleaning blade, which is brought into contact with the image holder, accounts for 75% or more of a total amount of F and Si present within 5 μm from the surface.

* * * * *